United States Patent
Carlson et al.

(10) Patent No.: US 11,182,549 B2
(45) Date of Patent: Nov. 23, 2021

(54) SYSTEMS AND METHODS FOR MODIFYING AND RECONCILING NEGOTIATED DOCUMENTS

(71) Applicant: AppExtremes, LLC, Broomfield, CO (US)

(72) Inventors: Bailey L Carlson, Denver, CO (US); Christian J. King, Orlando, FL (US); Natasha Roloff, Broomfield, CO (US); Doug Paul Rybacki, Seattle, WA (US); Jordan D. Pesusich, Brighton, CO (US)

(73) Assignee: AppExtremes, LLC, Broomfield, CO (US)

(*) Notice: Subject to any disclaimer, the term of this patent is extended or adjusted under 35 U.S.C. 154(b) by 0 days.

(21) Appl. No.: 15/826,026

(22) Filed: Nov. 29, 2017

(65) Prior Publication Data

US 2018/0253409 A1 Sep. 6, 2018

Related U.S. Application Data

(60) Provisional application No. 62/467,666, filed on Mar. 6, 2017.

(51) Int. Cl.
*G06F 40/197* (2020.01)
*G06F 40/194* (2020.01)
(Continued)

(52) U.S. Cl.
CPC .......... *G06F 40/197* (2020.01); *G06F 40/194* (2020.01); *G06F 40/205* (2020.01); *G06F 40/279* (2020.01)

(58) Field of Classification Search
CPC ............. G06F 17/2288; G06F 17/2211; G06F 17/2705; G06F 40/103; G06F 40/117;
(Continued)

(56) References Cited

U.S. PATENT DOCUMENTS 6,289,460 B1 9/2001 Hajmiragha
6,298,342 B1 10/2001 Graefe
(Continued)

FOREIGN PATENT DOCUMENTS

EP 1447754 A1 8/2004

OTHER PUBLICATIONS

International Search Report and Written Opinion for PCT/US2018/052056, dated Dec. 10, 2018. 6 pages.
(Continued)

*Primary Examiner* — Chau T Nguyen
(74) *Attorney, Agent, or Firm* — FisherBroyles LLP; Ian R. Walsworth

(57) ABSTRACT

Systems for identifying, tagging, modifying and reconciling information contained in a document are the subjects of the present disclosure. In one embodiment, the document may be linked to one or more source data formats, which are maintained as the document is modified by one or more users over time. The modifications are tracked and associated source data is updated to reflect those modifications. Clauses, terms and conditions may be revised and templates created based on revisions, and accessed by a user for subsequent use. Methods for selecting, modifying, reconciling and tracking a document, as well as presenting suggestions for a document are also disclosed.

20 Claims, 19 Drawing Sheets

(51) Int. Cl.
*G06F 40/205* (2020.01)
*G06F 40/279* (2020.01)

(58) Field of Classification Search
CPC .... G06F 40/166; G06F 40/186; G06F 40/194;
G06F 40/197; G06F 40/205; G06F
40/279; G06F 16/235; G06F 16/2358;
G06F 16/27; G06F 16/284; G06F 3/0482;
G06F 3/0484
USPC ........................................................ 715/229
See application file for complete search history.

(56) References Cited

U.S. PATENT DOCUMENTS

| | | | |
|---|---|---|---|
| 6,944,648 B2 | 9/2005 | Cochran et al. | |
| 7,278,168 B1 | 10/2007 | Chaudhury et al. | |
| 7,315,947 B2 | 1/2008 | Pravetz et al. | |
| 7,353,246 B1 * | 4/2008 | Rosen | G06F 17/30855 |
| | | | 707/999.01 |
| 7,353,397 B1 | 4/2008 | Herbach | |
| 7,370,206 B1 | 5/2008 | Goldman | |
| 7,395,503 B1 | 7/2008 | Pravetz | |
| 7,406,599 B1 | 7/2008 | Pravetz et al. | |
| 7,434,048 B1 | 10/2008 | Shapiro et al. | |
| 7,581,106 B1 | 8/2009 | Das et al. | |
| 7,660,981 B1 | 2/2010 | Hunt | |
| 7,694,145 B1 | 4/2010 | Pravetz et al. | |
| 7,698,559 B1 | 4/2010 | Chaudhury et al. | |
| 7,707,642 B1 | 4/2010 | Herbach et al. | |
| 7,735,144 B2 | 6/2010 | Pravetz et al. | |
| 7,770,015 B1 | 8/2010 | Goldman et al. | |
| 7,774,608 B2 | 8/2010 | Pravetz et al. | |
| 7,840,802 B1 | 11/2010 | Shapiro et al. | |
| 7,895,166 B2 | 2/2011 | Foygel et al. | |
| 7,900,132 B2 | 3/2011 | Matveief et al. | |
| 7,996,367 B2 | 8/2011 | Foygel et al. | |
| 7,996,439 B2 | 8/2011 | Foygel et al. | |
| 8,024,561 B2 | 9/2011 | Das et al. | |
| 8,145,909 B1 | 3/2012 | Agrawal et al. | |
| 8,151,114 B2 | 4/2012 | Chaudhury et al. | |
| 8,166,393 B1 | 4/2012 | Pravetz | |
| 8,185,741 B1 | 5/2012 | Agrawal et al. | |
| 8,239,496 B2 | 8/2012 | Peterson et al. | |
| 8,261,082 B1 | 9/2012 | Goldman | |
| 8,275,993 B2 | 9/2012 | Pravetz et al. | |
| 8,359,473 B1 | 1/2013 | Sorotokin et al. | |
| 8,539,004 B2 | 9/2013 | Foygel et al. | |
| 8,583,705 B2 | 11/2013 | Foygel et al. | |
| 8,620,953 B2 | 12/2013 | Foygel et al. | |
| 8,621,222 B1 | 12/2013 | Das | |
| 8,627,269 B2 | 1/2014 | Malasky et al. | |
| 8,635,442 B2 | 1/2014 | Agrawal | |
| 8,655,961 B2 | 2/2014 | McCabe et al. | |
| 8,683,605 B1 | 3/2014 | Tenenboym et al. | |
| 8,688,997 B2 | 4/2014 | Das et al. | |
| 8,713,322 B2 | 4/2014 | Pravetz et al. | |
| 8,793,193 B2 | 7/2014 | Sorotokin et al. | |
| 8,793,492 B2 | 7/2014 | Shah et al. | |
| 8,806,193 B2 | 8/2014 | Swaminathan et al. | |
| 8,832,047 B2 | 9/2014 | Herbach et al. | |
| 8,838,980 B2 | 9/2014 | Gonser et al. | |
| 8,844,055 B2 | 9/2014 | Follis et al. | |
| 8,868,916 B2 | 10/2014 | Shapiro | |
| 8,874,923 B2 | 10/2014 | Foygel | |
| 8,910,258 B2 | 12/2014 | Gonser et al. | |
| 8,914,639 B2 | 12/2014 | Hogan | |
| 8,949,706 B2 | 2/2015 | McCabe et al. | |
| 8,949,708 B2 | 2/2015 | Peterson et al. | |
| 8,954,731 B2 | 2/2015 | Tenenboym et al. | |
| 9,009,477 B2 | 4/2015 | Das | |
| 9,058,506 B2 | 6/2015 | Pravetz | |
| 9,158,750 B2 | 10/2015 | Matveief et al. | |
| 9,178,707 B2 | 11/2015 | Foygel | |
| 9,219,753 B2 | 12/2015 | Fleischman et al. | |
| 9,229,919 B1 * | 1/2016 | Krappe | G06F 40/197 |
| 9,230,130 B2 | 1/2016 | Peterson et al. | |
| 9,251,131 B2 | 2/2016 | McCabe et al. | |
| 9,253,206 B1 | 2/2016 | Fleischman | |
| 9,268,758 B2 | 2/2016 | Gonser et al. | |
| 9,276,749 B2 | 3/2016 | Tenenboym et al. | |
| 9,292,876 B1 | 3/2016 | Shimkus | |
| 9,323,937 B2 | 4/2016 | Follis et al. | |
| 9,344,424 B2 | 5/2016 | Tenenboym et al. | |
| 9,372,858 B1 * | 6/2016 | Vagell | G06F 17/274 |
| 9,384,178 B2 | 7/2016 | Nydam et al. | |
| 9,411,971 B2 | 8/2016 | Follis | |
| 9,432,368 B1 | 8/2016 | Saxena et al. | |
| 9,514,117 B2 | 12/2016 | Gonser | |
| 9,521,001 B2 | 12/2016 | Follis et al. | |
| 9,544,149 B2 | 1/2017 | Follis | |
| 9,613,016 B2 | 4/2017 | Pravetz | |
| 9,614,681 B2 | 4/2017 | Follis et al. | |
| 9,626,653 B2 | 4/2017 | Saxena et al. | |
| 9,628,462 B2 | 4/2017 | Gonser et al. | |
| 9,634,975 B2 | 4/2017 | McCabe et al. | |
| 9,692,601 B2 | 6/2017 | Follis | |
| 9,703,982 B2 | 7/2017 | Kumar et al. | |
| 9,727,522 B1 * | 8/2017 | Barber | G06F 9/5016 |
| 9,736,127 B2 | 8/2017 | Fleischman et al. | |
| 9,742,746 B2 | 8/2017 | Fleischman et al. | |
| 9,768,965 B2 | 9/2017 | Tenenboym et al. | |
| 9,798,709 B2 | 10/2017 | Malden | |
| 9,798,710 B2 | 10/2017 | McCabe et al. | |
| 9,800,556 B2 | 10/2017 | Steeves et al. | |
| 9,805,134 B2 * | 10/2017 | Goldstein | G06F 40/166 |
| 9,818,138 B2 | 11/2017 | Shimkus | |
| 9,824,198 B2 | 11/2017 | Carroll et al. | |
| 9,842,095 B2 | 12/2017 | Kumar et al. | |
| 9,842,201 B2 | 12/2017 | Follis et al. | |
| 9,882,725 B2 | 1/2018 | Foygel | |
| 9,893,895 B2 | 2/2018 | Peterson et al. | |
| 9,953,026 B2 * | 4/2018 | Kinder | G06F 17/274 |
| 10,482,391 B1 | 11/2019 | Lynch | |
| 2003/0023622 A1 | 1/2003 | Obermeyer | |
| 2004/0003097 A1 * | 1/2004 | Willis | G06F 17/30867 |
| | | | 709/228 |
| 2004/0205448 A1 | 10/2004 | Grefenstette | |
| 2004/0225718 A1 | 11/2004 | Heinzel | |
| 2005/0015377 A1 * | 1/2005 | Wan | G06F 16/254 |
| 2005/0165888 A1 * | 7/2005 | Elliott | G06Q 10/10 |
| | | | 709/203 |
| 2006/0004703 A1 * | 1/2006 | Spivack | G06F 17/3089 |
| 2006/0053171 A1 * | 3/2006 | Eldridge | G06F 16/38 |
| 2006/0129383 A1 * | 6/2006 | Oberlander | G06F 17/274 |
| | | | 704/10 |
| 2006/0173876 A1 | 8/2006 | Kihneman | |
| 2006/0235732 A1 | 10/2006 | Miller et al. | |
| 2007/0185935 A1 | 8/2007 | Olivieri | |
| 2007/0239514 A1 | 10/2007 | Lissy et al. | |
| 2008/0229313 A1 | 9/2008 | Motoyama et al. | |
| 2008/0270462 A1 * | 10/2008 | Thomsen | G06F 16/355 |
| 2009/0019353 A1 * | 1/2009 | Abrams | G06F 40/14 |
| | | | 715/224 |
| 2009/0150429 A1 * | 6/2009 | Yamamoto | G06F 16/907 |
| 2009/0182824 A1 | 7/2009 | Haynes et al. | |
| 2009/0204470 A1 | 8/2009 | Weyl et al. | |
| 2009/0204471 A1 | 8/2009 | Elenbaas et al. | |
| 2010/0228693 A1 * | 9/2010 | Dawson | G06F 16/322 |
| | | | 706/12 |
| 2010/0262653 A1 | 10/2010 | Chaffee et al. | |
| 2010/0280821 A1 * | 11/2010 | Tiitola | G06F 17/276 |
| | | | 704/200 |
| 2011/0043652 A1 | 2/2011 | King | |
| 2011/0145805 A1 | 6/2011 | Taylor et al. | |
| 2011/0191417 A1 | 8/2011 | Rathod | |
| 2011/0238437 A1 * | 9/2011 | Zhou | G06Q 50/22 |
| | | | 705/2 |
| 2013/0050512 A1 | 2/2013 | Gonser et al. | |
| 2013/0254111 A1 | 9/2013 | Gonser et al. | |
| 2014/0032529 A1 * | 1/2014 | Chang | G06F 16/954 |
| | | | 707/722 |
| 2014/0207731 A1 | 7/2014 | Mack | |
| 2014/0279838 A1 | 9/2014 | Amiato | |

(56) References Cited

U.S. PATENT DOCUMENTS

| | | |
|---|---|---|
| 2014/0304518 A1 | 10/2014 | Gonser et al. |
| 2014/0350966 A1 | 11/2014 | Khatana et al. |
| 2015/0067464 A1 | 3/2015 | McCabe et al. |
| 2015/0143218 A1 | 5/2015 | Peterson et al. |
| 2015/0180833 A1* | 6/2015 | Snow ............... G06F 21/6245 713/155 |
| 2015/0248484 A1* | 9/2015 | Yu ..................... G06Q 30/02 707/711 |
| 2015/0317295 A1* | 11/2015 | Sherry ................ G06F 40/117 715/226 |
| 2016/0034526 A1* | 2/2016 | Pringuey ............ G06F 16/2425 707/721 |
| 2016/0140101 A1 | 5/2016 | Gosner, Jr. et al. |
| 2016/0182560 A1 | 6/2016 | Fleischman |
| 2016/0224526 A1 | 8/2016 | Gazit et al. |
| 2016/0226829 A1 | 8/2016 | Steeves et al. |
| 2016/0239471 A1 | 8/2016 | Shimkus |
| 2016/0255139 A1* | 9/2016 | Rathod ............. G06F 16/9535 709/203 |
| 2016/0266881 A1* | 9/2016 | Thompson ............ G06F 9/445 |
| 2016/0378629 A1 | 12/2016 | Gwozdz |
| 2017/0223022 A1 | 8/2017 | Peterson et al. |
| 2017/0223093 A1 | 8/2017 | Peterson et al. |
| 2017/0329984 A1 | 11/2017 | Clough |
| 2017/0353314 A1 | 12/2017 | Steeves et al. |
| 2017/0353445 A1 | 12/2017 | Steeves et al. |
| 2017/0374048 A1 | 12/2017 | Fleischman et al. |
| 2018/0046655 A1 | 2/2018 | Ward |
| 2018/0067976 A1 | 3/2018 | Schoppe |
| 2018/0096027 A1 | 4/2018 | Romero |
| 2019/0034592 A1 | 1/2019 | Gupta |
| 2019/0197043 A1 | 6/2019 | Rajendran |

OTHER PUBLICATIONS

Zhang et al., Research and Implementation for Data Synchronization of Heterogeneous Databases, IEEE 2010, pp. 1-7. (Year: 2010).
International Search Report and Written Opinion from related PCT/US20/12230, dated Jun. 5, 2020. 9 pages.
International Preliminary Report on Patentability from PCT/US18/061513, dated Jun. 2, 2020. 6 Pages.
Supplementary European Search Report from related EP18882534, dated May 6, 2021. 9 pages.
Chakaravarthy, et al., Efficiently Linking Text Documents with Relevant Structured Information. Sep. 2006. 12 pages.
Beheshti et al. A Systematic Review and Comparative Analysis of Cross-Document Coreference Resolution Methods and Tools. Computing. Nov. 2013. 37 pages.
Patent Examination Report 1 from related NZ762940, dated Apr. 21, 2021. 5 pages.

* cited by examiner

| | Clause Type | Clause Rev | Clause Name | Standard | Document Name | Document Type | Doc Rev | Created On | Last Updated By | Last Updated |
|---|---|---|---|---|---|---|---|---|---|---|
| | (11 Items) | | | | | | | | | |
| 1 | General | * | | N | Master Services Agreement.docx | Contract Draft | 1 | 09/19 2017 | Williams, Mark | 09/19 2017 |
| 2 | General | * | | N | Master Services Agreement.docx | Contract Draft | 1 | 09/19 2017 | Williams, Mark | 09/19 2017 |
| 3 | Alternative | * | | N | Master Services Agreement.docx | Contract Draft | 1 | 09/19 2017 | Williams, Mark | 09/19 2017 |
| 4 | General | * | | N | Master Services Agreement.docx | Contract Draft | 1 | 09/19 2017 | Williams, Mark | 09/19 2017 |
| 5 | Fees general | * | | N | Master Services Agreement.docx | Contract Draft | 1 | 09/19 2017 | Williams, Mark | 09/19 2017 |
| 6 | Applicable Law | * | | N | Master Services Agreement.docx | Contract Draft | 1 | 09/19 2017 | Williams, Mark | 09/19 2017 |
| 7 | Alternative | * | | N | Master Services Agreement.docx | Contract Draft | 1 | 09/19 2017 | Williams, Mark | 09/19 2017 |
| 8 | Confidential Information | * | | N | Master Services Agreement.docx | Contract Draft | 1 | 09/19 2017 | Williams, Mark | 09/19 2017 |
| 9 | Confidential Information | * | | N | Master Services Agreement.docx | Contract Draft | 1 | 09/19 2017 | Williams, Mark | 09/19 2017 |
| 10 | Applicable Law | * | | N | Master Services Agreement.docx | Contract Draft | 1 | 09/19 2017 | Williams, Mark | 09/19 2017 |
| 11 | Applicable Law | * | | N | Master Services Agreement.docx | Contract Draft | 1 | 09/19 2017 | Williams, Mark | 09/19 2017 |

Fig. 13 nent") is entered into as of |July 1, 2017| ← 178 a Florida corporation with corporate

L 32

803  Capture: July 01, 2017 (done)

onl  Select from suggestion below or search alternate.
ll pr  Activated Date
end  Company Sign Date
it's  Contract End Date
info
pre
par  [ Clause ]  [ Contract Field ]
sure ubli  🔍 Search Contract Fields
sted
 Activated By ID       Activated Date
      Reference                          Datetime
yste   Amendment & Rene...   Amendment Opport...
or c        Picklist                           String
c) a   Amendment Opport...   Amendment Owner
lost        String                             Reference
vork   Amendment Pricebo...  Amendment Start Da...
rest        String                             Date
ts c   Billing City           Billing Country
g-ac        String                             String
       Billing Geocode Accu...  Billing Latitude
pai         Picklist                            Double
In Ex and charges hereunder are due and payable,

← 180

Fig. 15

SYSTEMS AND METHODS FOR MODIFYING AND RECONCILING NEGOTIATED DOCUMENTS

CROSS-REFERENCE TO RELATED APPLICATIONS

The present application claims priority to U.S. Provisional Patent Application Ser. No. 62/467,666, filed on Mar. 6, 2017, which is incorporated by reference herein in its entirety.

COPYRIGHT NOTICE

A portion of this disclosure is subject to copyright protection. Limited permission is granted to facsimile reproduction of the patent document or patent disclosure as it appears in the U.S. Patent and Trademark Office (USPTO) patent file or records. The copyright owner reserves all other copyright rights whatsoever.

FIELD OF THE INVENTION

The present invention is generally directed to systems and methods of identifying, tagging, modifying, incorporating, associating and reconciling information contained in legal, commercial and business-related documents.

BACKGROUND

Legal, commercial and business-related documents convey information in a variety of different manners. Documents of a legal, commercial or business nature are increasingly negotiated to a high degree, often involving numerous individuals across multiple organizations, causing further difficulties including, but not limited to, confusion reconciling different or multiple versions of a document, easily locating and replacing all of a certain data type when making a global change to a data point, inadvertently eliminating important modifications when accepting modifications to a document, creating ambiguities or otherwise eroding the context of a clause contained in the document, and other problems. Increasingly, the information in such documents may contain fields derived from a source document or from source data, and may organized according to one or more formats, templates or styles. For example, language contained in a document may include several fields associated with a Customer Relationship Management system, such as Salesforce.

In addition, predefined organization of data or content may be relied upon, or in some instances required by internal or external regulations when assembling important legal, commercial and/or business-related documents. Information in certain documents may need to be provided with a specified format or incorporating a pre-defined data model. As modifications to a document occur over time, the desired format or model can be lost or significantly eroded, in some instances leading to loss of valuable rights.

There are presently several shortcomings in the art with respect to managing, modifying, tracking and reconciling these dynamic documents while ensuring consistency and organization of critical data contained with such documents. It is with respect to these shortcomings and other issues identified herein presently faced by those of skill in the pertinent art that the embodiments of the present disclosure were contemplated.

SUMMARY

It is therefore one aspect of the present disclosure to provide a user with a system and method to modify a document, track modifications, reconcile modifications and facilitate the review and ultimate approval of the document. In embodiments, the document is, at least in part, a legal, commercial or business-related document. In embodiments, the document may have been (or is intended to be) modified several times by several different individual users, some of whom may use different applications or formatting when modifying the document.

It is yet another aspect to provide a user with an efficient way to insert, view and manage modifications to a dynamic document, including by comparing modifications among different versions of a document. In yet another aspect of the present disclosure, the system provides a user with a visual representation of the document throughout the negotiation process, or otherwise presents the user with a graphical representation of the status of the document to better monitor various manipulations occurring over the course of the document lifecycle.

It is another aspect to provide a system and method for associating and extracting source data information with a document that contains modifications, with the ability to update the source data information (manually or automatically) if any one document containing the information is subsequently modified. In another aspect, the system and method provides a user with the ability to efficiently identify text or other information in the document and associate the user selection with source data, by way of example, a Salesforce object and/or field. In embodiments, the user may the ability to create metadata tags and/or inject certain metadata with text or other information contained within the document. In other embodiments, the system and method provide alerts and/or notifications when information associated with source data has been added, modified or removed.

It is another aspect to synchronize data modified in a document with other documents from which the data was merged. For example, many documents have companion documents associated therewith, which may include common information or source data requiring modification once a change is made to any one associated document.

It is another aspect to provide a system and method for managing terms and clauses used in legal and business-related documents, which permits a user to search, identify, select and efficiently merge such terms and clauses into the document. It is a further aspect to provide a virtual resource library where previously created or modified terms, clauses or complete documents may be categorized and managed by the user.

It is another aspect to provide a system and method for automatically receiving suggestions or recommendations while engaged in any of the foregoing activities, for example suggesting a certain term based on either a particular clause incorporated by the user, or the appearance of a data source merged into the negotiated document. In yet another embodiment, the system and method provides analysis of the content of a document, identifies relationship(s) between discrete content in the document and realized (both potential and actual) objects/fields that may be associated with the document, and may provide suggestions or recommendations to the user in the same regard. For example, the system may recommend one or more Salesforce fields that text within the document may be associated with.

In one aspect of the present disclosure, a system for identifying and extracting text from an electronic document is described. The system may include one or more processors, memory and modules (including an identifier module and/or an extractor module) to receive and analyze the document and identify text and other fields in the document, recognize data to be associated within the document, and mark or tag that data. In this manner, any document type may employ the systems and methods described herein, regardless of whether the document was created using the systems and methods described herein. According to this embodiment, terms, clauses or other information contained in the document may be parsed, identified, categorized, compared (to user defined criteria), matched and tagged. In certain embodiments, the system and method also comprises the step of converting the document to a recognizable format and/or creating new categories/criteria based on the identification of a new term, clause, etc. In accordance with at least some embodiments of the present disclosure, the general process of identifying and extracting text from a document involves performing optical character recognition (OCR) on the document. In another embodiment, the identifying and extracting steps may involve a natural language engine. In yet another embodiment, the method may further comprise a learning engine.

In another aspect of the present disclosure, the system and method further comprises a library or equivalent repository for a user to store and retrieve clauses or other content for a document type. In embodiments, the system and method may be configured to automatically query, retrieve and incorporate content contained in the library, based on the document type, objects/fields identified within the document, or based on user preference.

In yet a further aspect of the present disclosure, a computer readable storage medium comprising processor executable instructions operable to utilize the system or perform the methods is provided.

The Summary is neither intended nor should it be construed as being representative of the full extent and scope of the present invention. The present invention is set forth in various levels of detail in the Summary as well as in the attached drawings and in the Detailed Description, and no limitation as to the scope of this disclosure is intended by either the inclusion or non-inclusion of elements, components, etc. in the Summary. Additional aspects of the present disclosure will become more readily apparent from the detailed description.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "machine-readable media" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a flexible disk, hard disk, magnetic tape, or any other magnetic medium, magneto-optical medium, a CD-ROM, any other optical medium, a RAM, a PROM, an EPROM, a FLASH-EPROM, a solid state medium like a memory card, any other memory chip or cartridge, or any other medium from which a computer or like machine can read.

When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute", and variations thereof, as used herein, are used interchangeably and include any type of methodology, process, mathematical operation or technique.

The term "module" as used herein refers to any known or later developed hardware, software, firmware, machine engine, artificial intelligence, fuzzy logic, or combination of hardware and software that is capable of performing the functionality associated with that element. Also, while the invention is described in terms of exemplary embodiments, it should be appreciated that individual aspects of the invention may be separately claimed.

BRIEF DESCRIPTION OF THE DRAWINGS

The present disclosure is described, in part, with reference to the appended drawing figures:

FIG. 7 illustrates a display for presenting a document for modification in accordance with embodiments of the present disclosure;

FIG. 11 depicts yet another reconciliation module display in accordance with embodiments of the present disclosure;

FIG. 13 depicts yet another clause identification module display in accordance with embodiments of the present disclosure;

FIG. 15 depicts yet another suggestion service module display in accordance with embodiments of the present disclosure;

DETAILED DESCRIPTION

Figure 1:
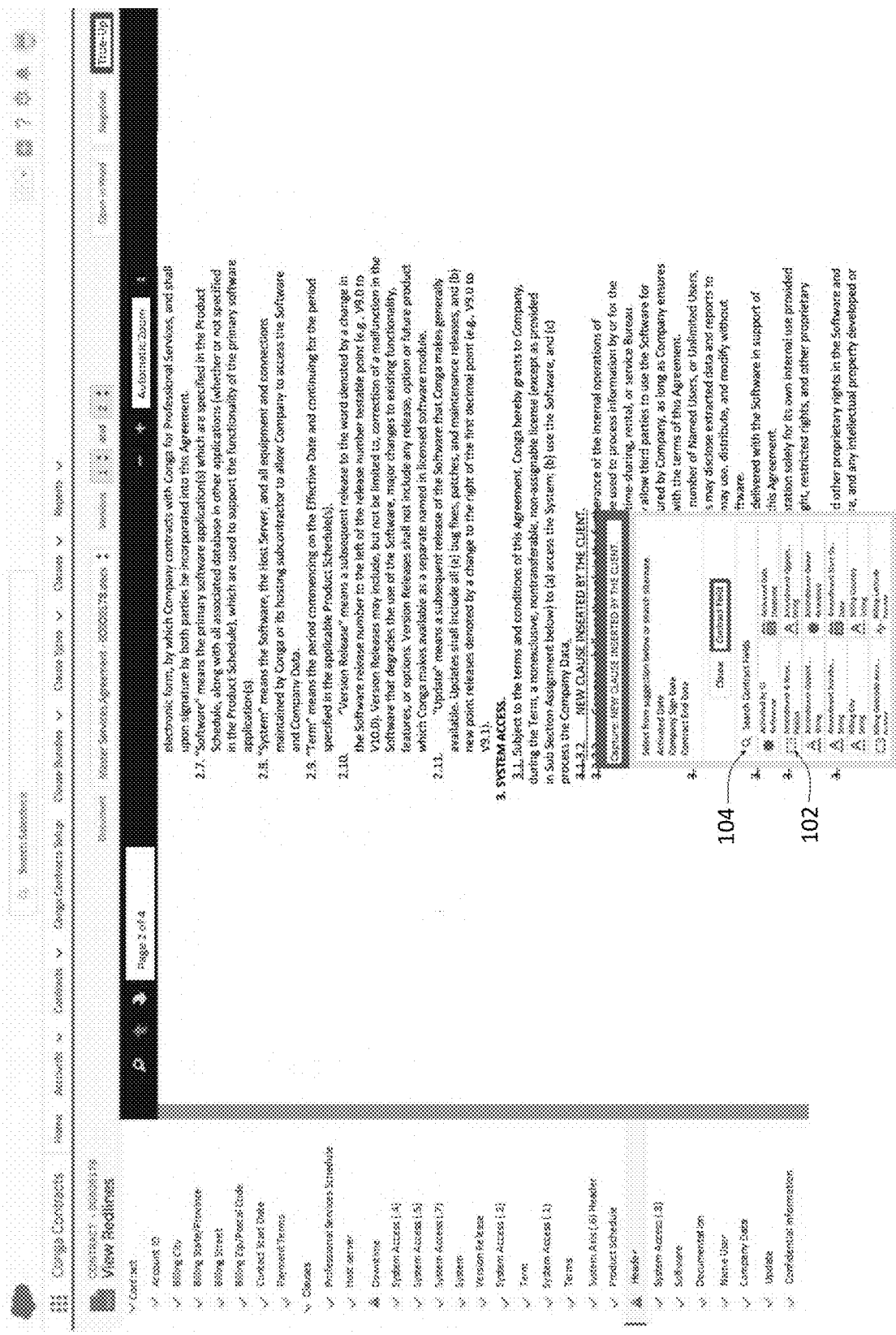
FIG. 1 illustrates one aspect of the present disclosure that permits a user to capture text in a document and associate that text with a data source, according to an embodiment.

The present disclosure in varying embodiments relates to systems and methods for identifying, tagging, modifying and reconciling information contained in a document. The system and method applies to a variety of legal, commercial and business-related documents, and may be modified by one or more users over time. As used herein, "modification" and variants thereof are intended to include additions, subtractions, associations, affiliations, revisions, reformats, comments, edits, attachments, linking, tagging, mapping, grouping, categorizing, replacing, removing or otherwise changing the content and affiliated information contained within the document. In embodiments described herein, modifications are tracked and associated source data is updated to reflect those modifications. By way of example but not limitation, clauses, terms and conditions within a particular document and companion documents may be revised and the document dynamically altered by one or more individuals without loss of associated data, objects or fields. Further, the system and method provides a user with the ability to create and manage templates based on clauses, terms and conditions (and subsequent revisions), which may be accessed by the user or a different user for incorporation with similar or related documents. The templates may be contained in a library or similar repository, and may be easily managed, searched and retrieved by a user.

Other benefits and aspects of the systems and methods disclosed herein will be better understood after reviewing the Summary and Detailed Description herein. The ensuing description provides embodiments only, and is not intended to limit the scope, applicability, or configuration of the claimed invention. Rather, the ensuing description will provide those skilled in the art with an enabling description for implementing the embodiments. It should be understood that various changes may be made in the function and arrangement of elements without departing from the spirit and scope of the appended claims.

Furthermore, while embodiments of the present disclosure will be described in connection with various examples of documents, it should be appreciated that embodiments of the present disclosure are not so limited. In particular, embodiments of the present disclosure may be applied to any document and any data source. For instance, while embodiments of the present invention may be described with respect to Salesforce or equivalent CRM, the inventions described herein are not so limited. More particularly, the aspects of the invention described herein may apply to a wide range of documents, including contracts, invoices, purchase orders, terms of sale, memoranda of understanding, warranty documents, license agreements, assignments, settlement agreements, and other legal, commercial and business documents, regardless of the repository where those document types are stored. It should be understood the reference to one particular document, such as a contract, is for illustrative purposes only and should not be construed as limiting the claimed invention.

In view of the foregoing, various embodiments of the present disclosure will now be described in detail. The ensuing description provides embodiments only, and is not intended to limit the scope, applicability, or configuration of the claimed invention. Rather, the ensuing description will provide those skilled in the art with an enabling description for implementing the embodiments, and that various changes may be made in the function and arrangement of elements without departing from the spirit and scope of the appended claims.

Figure 2:
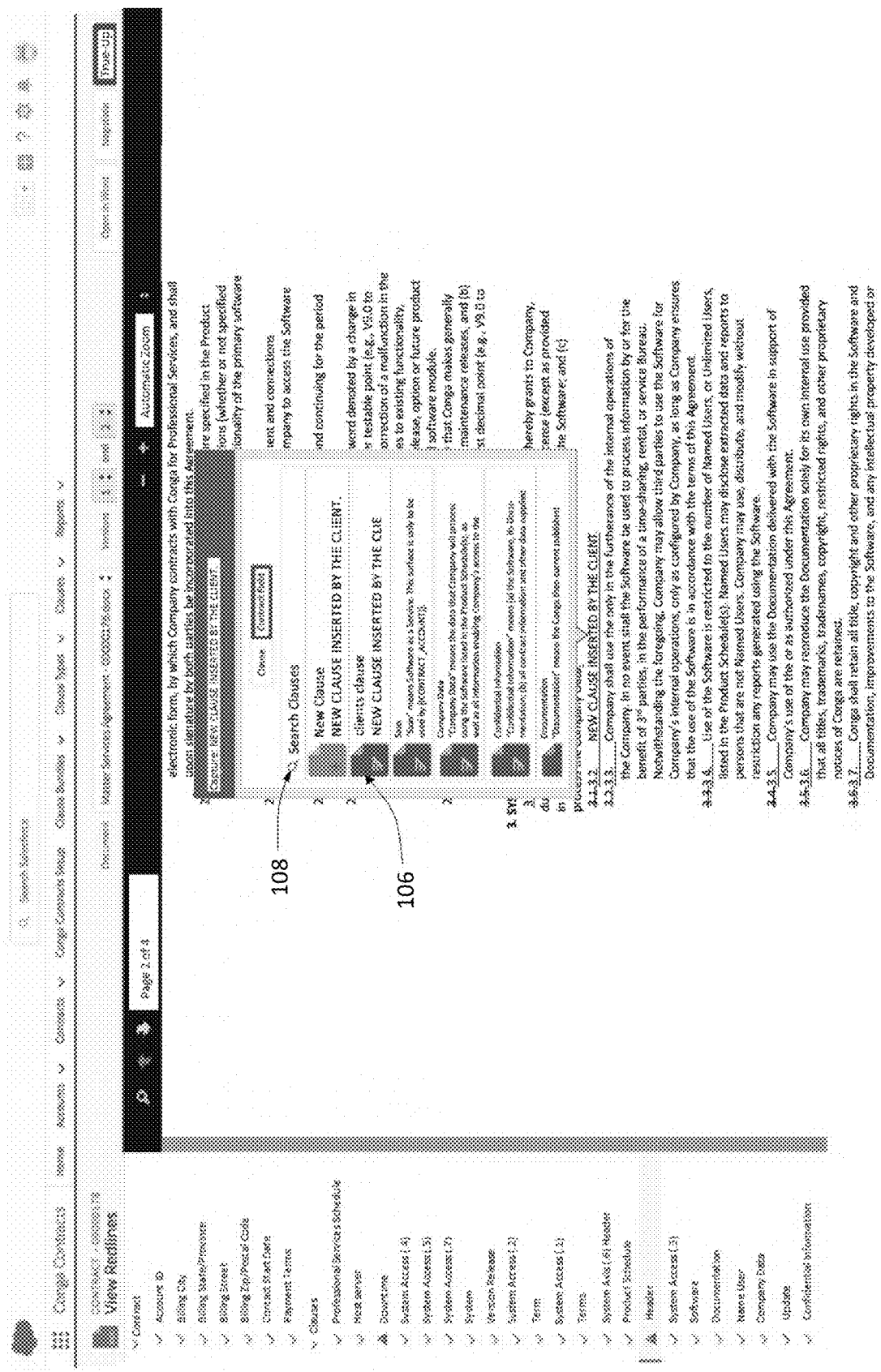
FIG. 2 illustrates another view of the embodiment illustrated in FIG. 1.

According to embodiments, the present disclosure relates to systems and methods for associating information contained in a document with source data. Referring now to FIGS. 1-5, various user interfaces corresponding to this embodiment are shown. As shown in FIG. 1, a user display may include one of several different types of documents, such as a contract, which is comprised of multiple clauses, terms and conditions. A user may select certain text or other information contained within the contract by highlighting the desired content. Next, the user is preferably presented with a pop-over user interface 100 for selecting the appropriate object and/or field corresponding to a data source, such as a database or CRM, including Salesforce. As shown in FIG. 1, the user may be presented with a listing of options 102 for mapping data corresponding to a "Contract Field" as well as the ability to search for a particular Contract Field 104. Alternatively, as shown in FIG. 2, the user may be presented with a listing of options 106 for mapping data corresponding to a particular "Clause" in the contract, and the ability to "Search Clauses" 108 stored by the system. In this manner, the user may select the appropriate data source to associate with the captured text. In embodiments, the user may select multiple data types to associate with a particular text string, clause or provision in the contract, etc.

Figure 3:
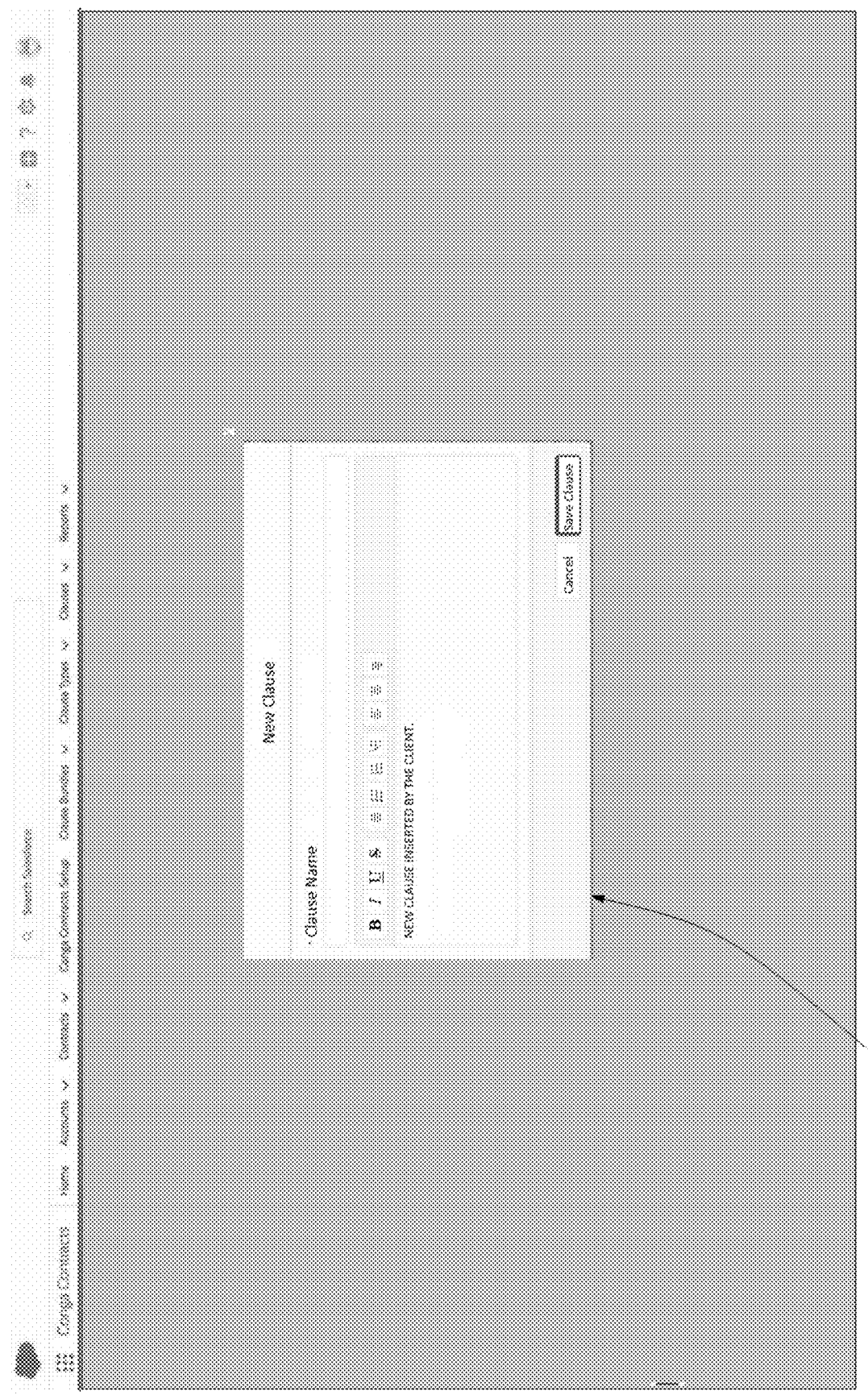
FIG. 3 illustrates a pop-over user interface according to the embodiment illustrated in FIG. 1.
Figure 4:
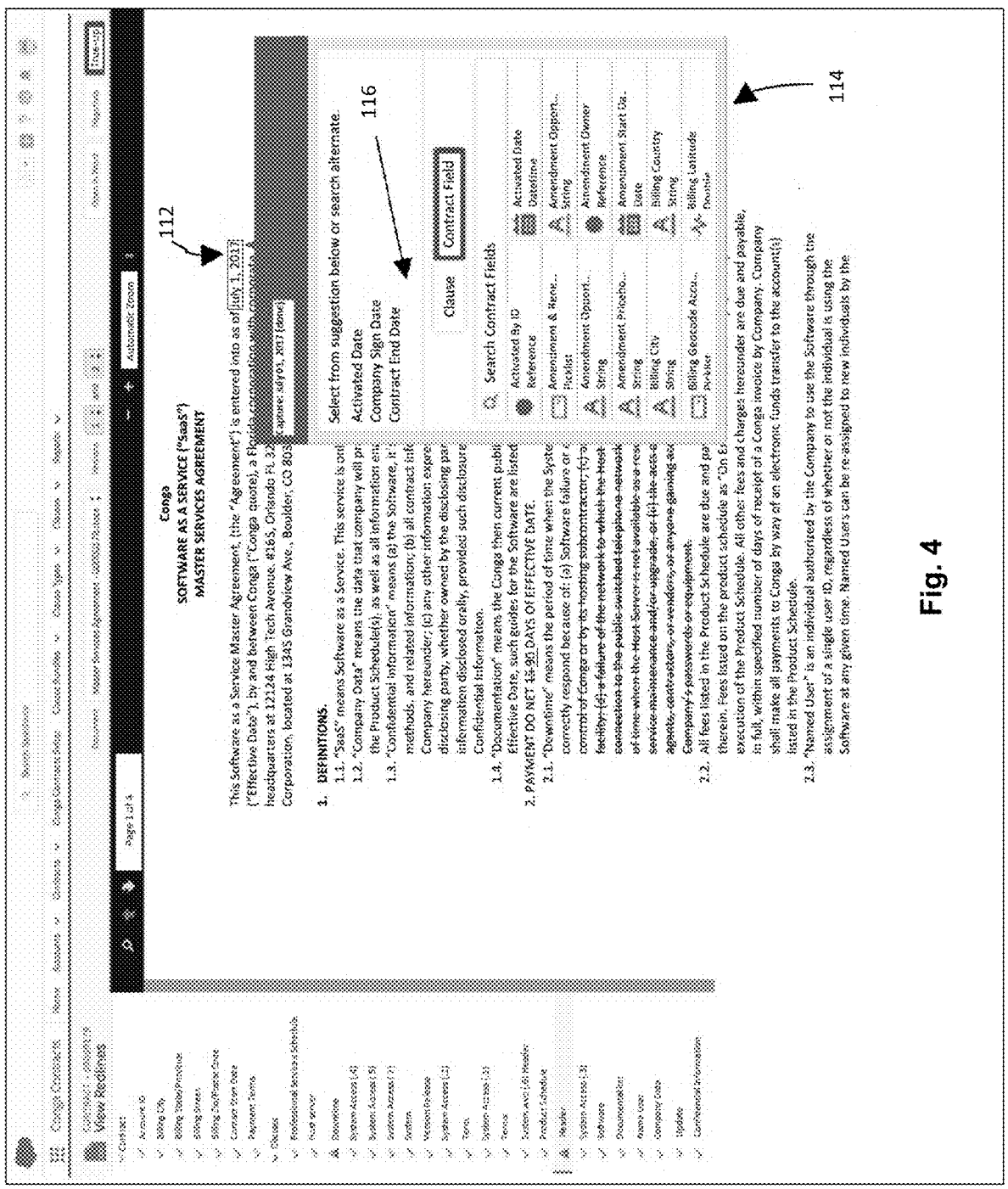
FIG. 4 illustrates yet another view of the embodiment illustrated in FIG. 1.
Figure 5:
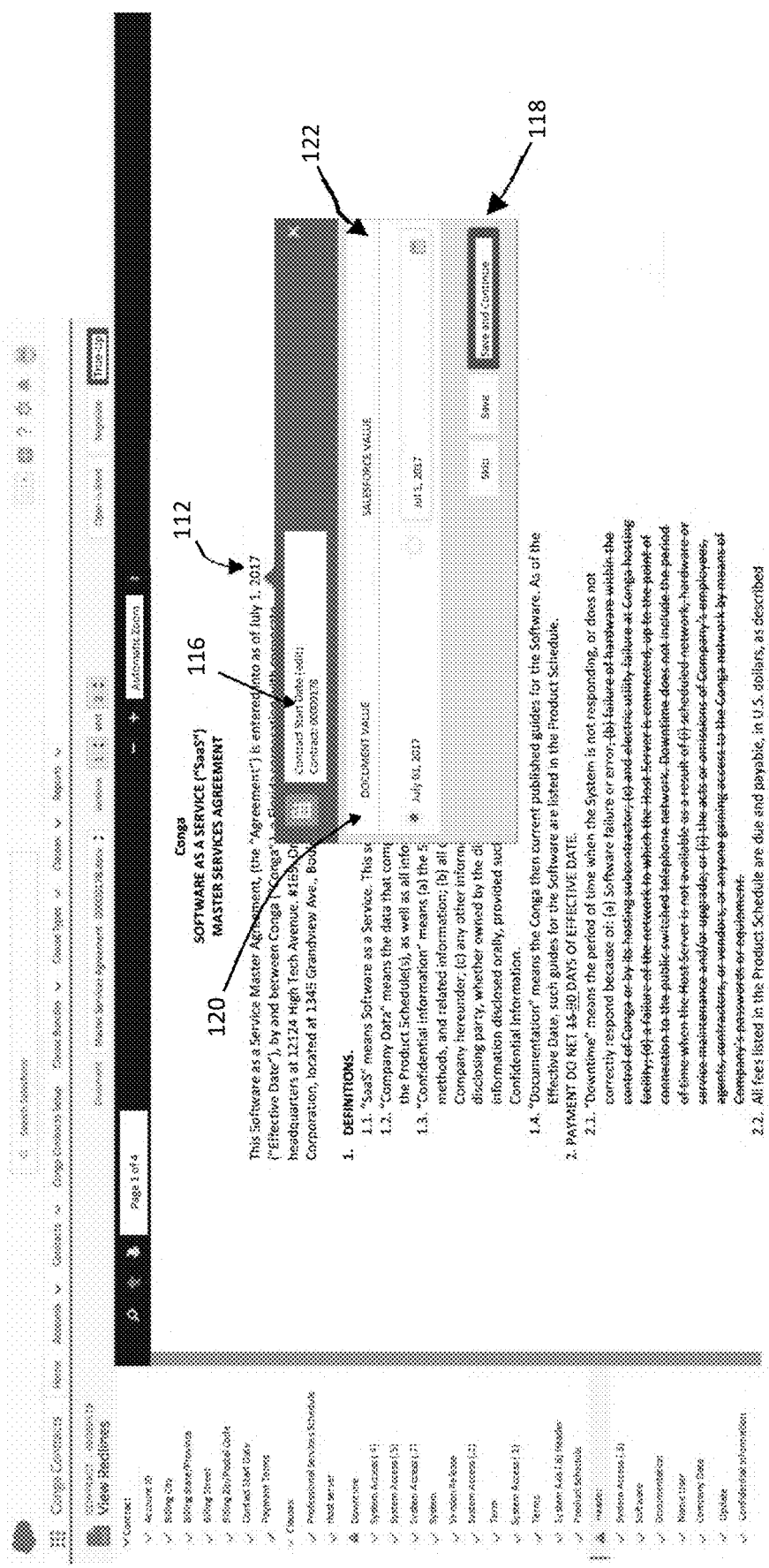
FIG. 5 illustrates yet another view of the embodiment illustrated in FIG. 1.

Once the user has made all desired selections for the highlighted text, the pop-over user interface 110 shown in FIG. 3 is displayed, allowing the user to name and save the selections in the system. To further illustrate the concepts described above, reference is made now to FIGS. 4-5. In FIG. 4, a text string has been highlighted 112 to call up the pop-over user interface 114, similar to that described in connection with FIG. 1. Here, the pop-over user interface 114 may recognize a part of the text string, and provide suggestions of various object and/or field data to associate with the highlighted text. Alternatively, the user may select from the broader listing of options contained within the pop-over user interface 114, or may conduct a search for the appropriate selection(s). The user may select the option "Contract Start Date" 116 using any of the three options described above. Referring to FIG. 5, once the user selection is made, the pop-over user interface 118 allows the user to save the selection, and may further display the document value and corresponding source data value (the "Document Value" 120 and "Salesforce Value" 122 fields shown in FIG.

5). Using this same capability, a user may select any tagged text string, clause or provision in the contract and quickly retrieve and modify, if necessary, the document value or the data source value. The user may extract the source data, perform reconciliation, or one of the other functions described herein using this user interface, several of which are described in further detail below.

Accordingly, the system provides a user with the ability to quickly view and/or extract data linked to the selected text in a document. Furthermore, the system according to this embodiment allows a user to update source data information automatically, including in the event any one document (regardless of whether the document is the one containing the originally selected text or a companion document associated with the same) implicated by the source data is subsequently modified. This prevents errors and omissions when negotiating and finalizing the document.

In another embodiment, the user may be presented with an interface to update or reconcile source data associated with a document, particularly if the source data information has been changed within the source data repository. Alternatively, the user may update the objects and/or fields associated with the document, including by adding, removing or altering a previous selection. This may be helpful when a particular text string has more than one consequence (i.e., contract term and warranty term) or when the text string represents more than a single object and/or field within Salesforce or equivalent CRM.

In the embodiments described above, the system provides a user with the ability to efficiently identify text or other information in the document and associate the user selection with source data, such as Salesforce objects and/or fields.

According to one embodiment, a system and method is provided for dynamically modifying a document and tracking modifications made during the course of the document life cycle, including to data contained within the document. In an exemplary embodiment, a user may desire to modify a document created by, for example, Microsoft Word. In this example, the user may have further associated data from a CRM, such as Salesforce, by using a composer tool such as Conga Composer. In this embodiment, the user may extract data from Salesforce and embed that data in the Word document using Conga Composer. When pulling data from Salesforce and merging that data into the document, the system may advantageously mark or tag data elements that tell the user the data source. In a preferred embodiment, the tags are a hidden element, and not immediately visible to the user or a subsequent user of the system. In other embodiments, the tags are selectively visible by the user.

The tags applied to data thereby permit selected text in the Word document to be associated with the data source(s), which allows the data to be updated in, for example, Salesforce or an equivalent CRM, even though the user may make modifications to the document independently from Salesforce. This feature will be described in more detail below as it relates to reconciliation of modified documents, and tagged data within those modified portions of a document.

Figure 6:
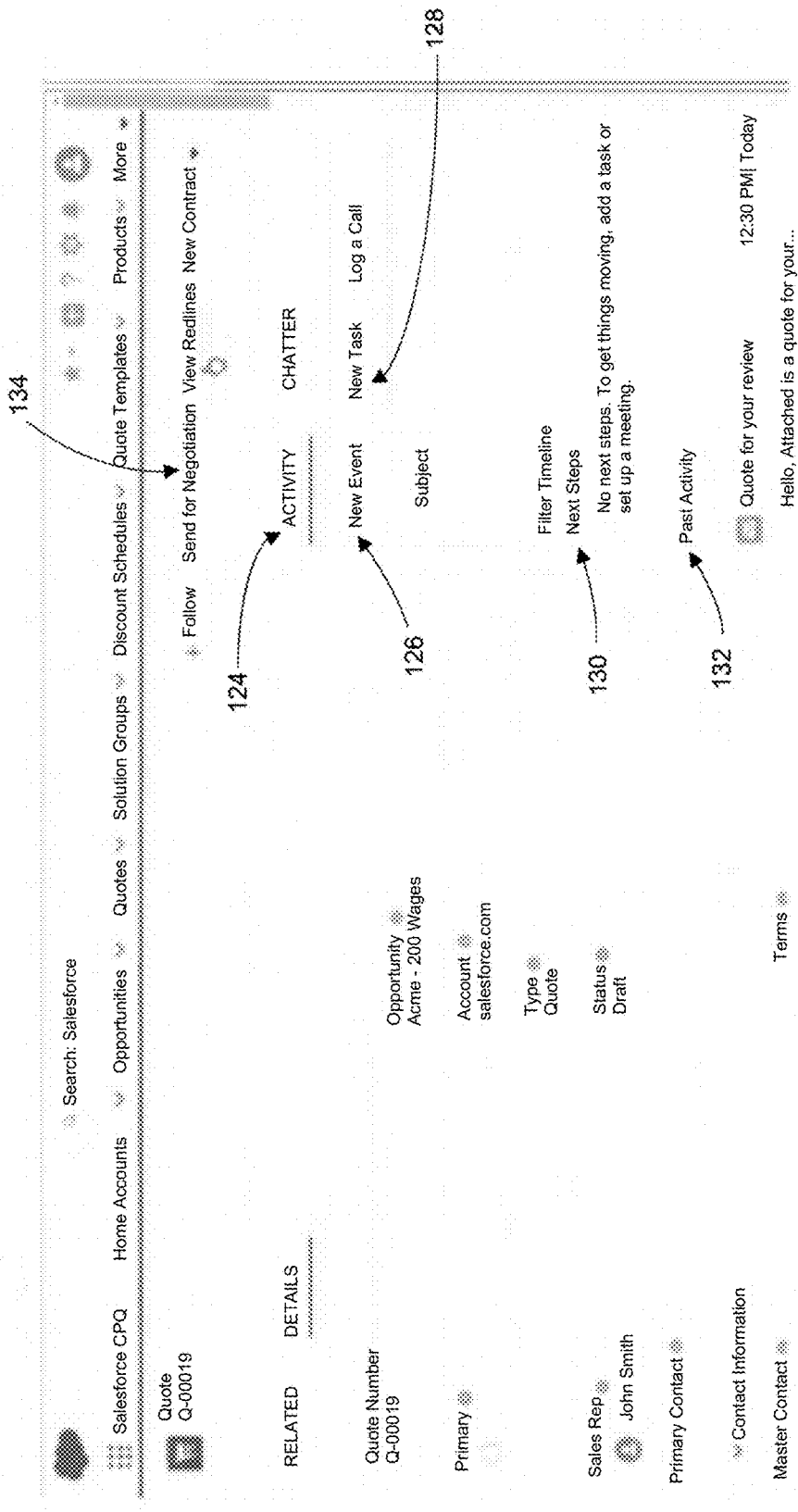
FIG. 6 illustrates a display for information associated with a particular document in accordance with embodiments of the present disclosure.

To further illustrate the process of modifying a document, and by way of example, a user may begin the process using an application known as Conga Contracts. One exemplary user interface is shown in FIG. 6, which comprises an overview of various capabilities and tools of the system described herein. For example, the user has the ability to input activities 124 associated with a document, including adding a new event 126, a new task 128, inputting future steps 130 or comment on past activity 132, etc. The user interface of FIG. 6 further comprises the ability to send a selected document 134 to other parties for negotiation, or to view modifications made to a document by one or more parties.

According to embodiments, an original user of the document may communicate with other users, by email correspondence, with the document provided as an attachment. When the original user sends the email and attached document, the system applies a tracking identifier. This identifier may be viewed as a service, running in the background of the system and independently of the user, for monitoring the evolution of the document and tagged data within the document as it is modified. The identifier service is programmed to listen for subsequent usage of the document by tracking the original email and subsequent emails in the thread. In one embodiment, the service is specifically configured to watch for attachments to the email thread, as users respond and reply to the original email, and extract a subsequent version of the attached document. Once identified and extracted, the subsequent version of the document may be uploaded to, for example, Salesforce or equivalent CRM. By way of example only, the modified document attached to an email may be uploaded to a document repository in Salesforce called Content. As emails are sent and subsequent versions of the document are attached, the system automatically watches for, extracts and uploads subsequent versions of the document, and in a preferred embodiment creates a new version of that particular document in the repository.

As changes are made to the document, therefore, each version of the modified document is automatically preserved and stored by the system. One aspect of the system then permits a user to compare any one version of the document with any subsequent version of the document. The system also permits individual or group users to incorporate comments, proposed terms or clauses, or other annotations to facilitate the completion of a final, negotiated document.

Figure 7:
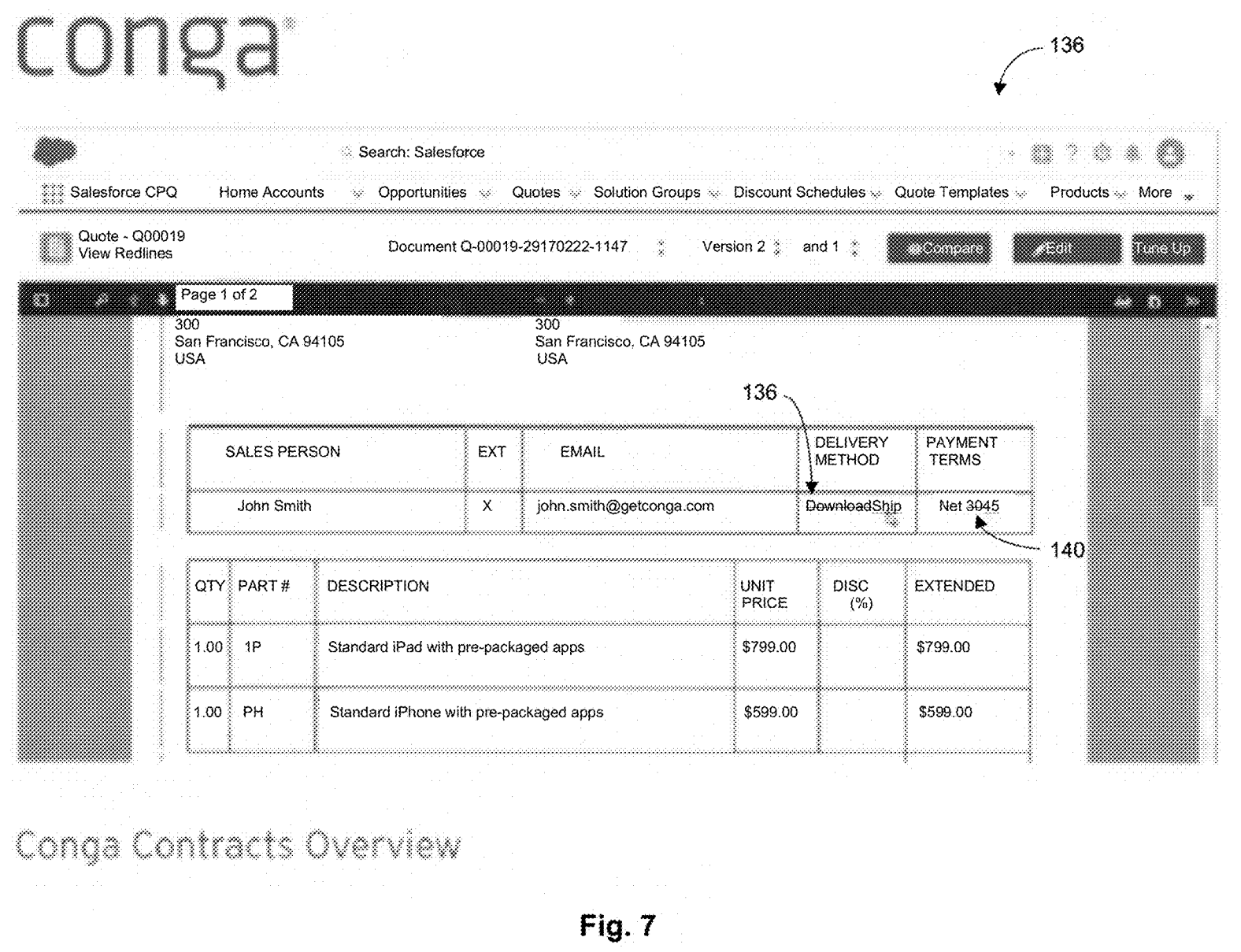
Figure 8:
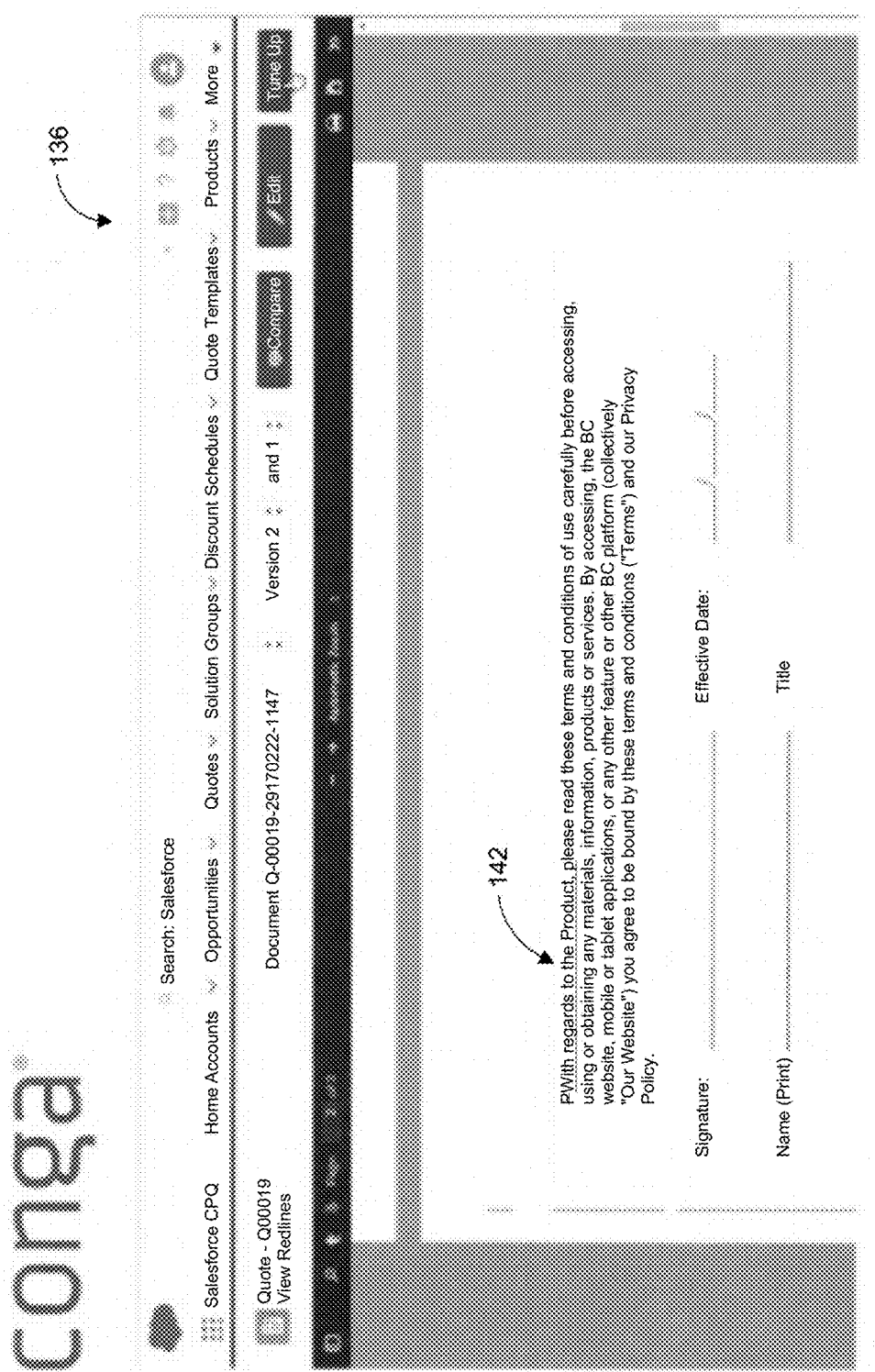
FIG. 8 illustrates another display for presenting a document for modification in accordance with embodiments of the present disclosure.

Referring now to FIG. 7, a user interface 136 is shown according to one embodiment for a user to view dynamic modifications made to a document. Modifications may be made directly by another party, or may be merged into the document as a result of changes to the source data. The modifications are preferably highlighted 138 or called out to the user through the user interface 136, and may comprise changes to specific terms 140, as shown in FIG. 7, or to clauses 142 or other language appearing in the document, as shown in FIG. 8. The user may take on or more actions relative to their review of the modified document, as described in greater detail below.

Figure 9:
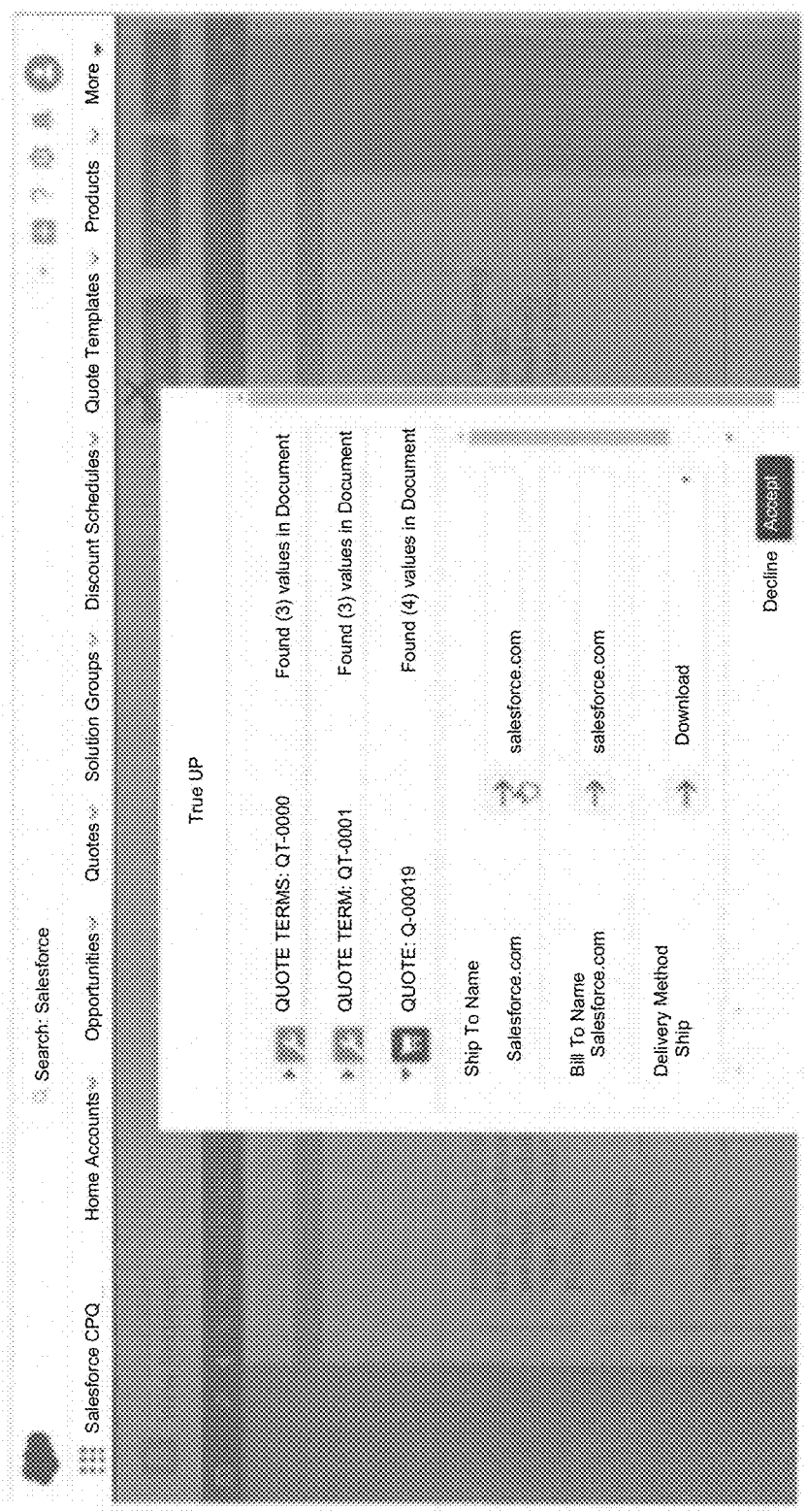
FIG. 9 depicts a reconciliation module display in accordance with embodiments of the present disclosure.
Figure 10:
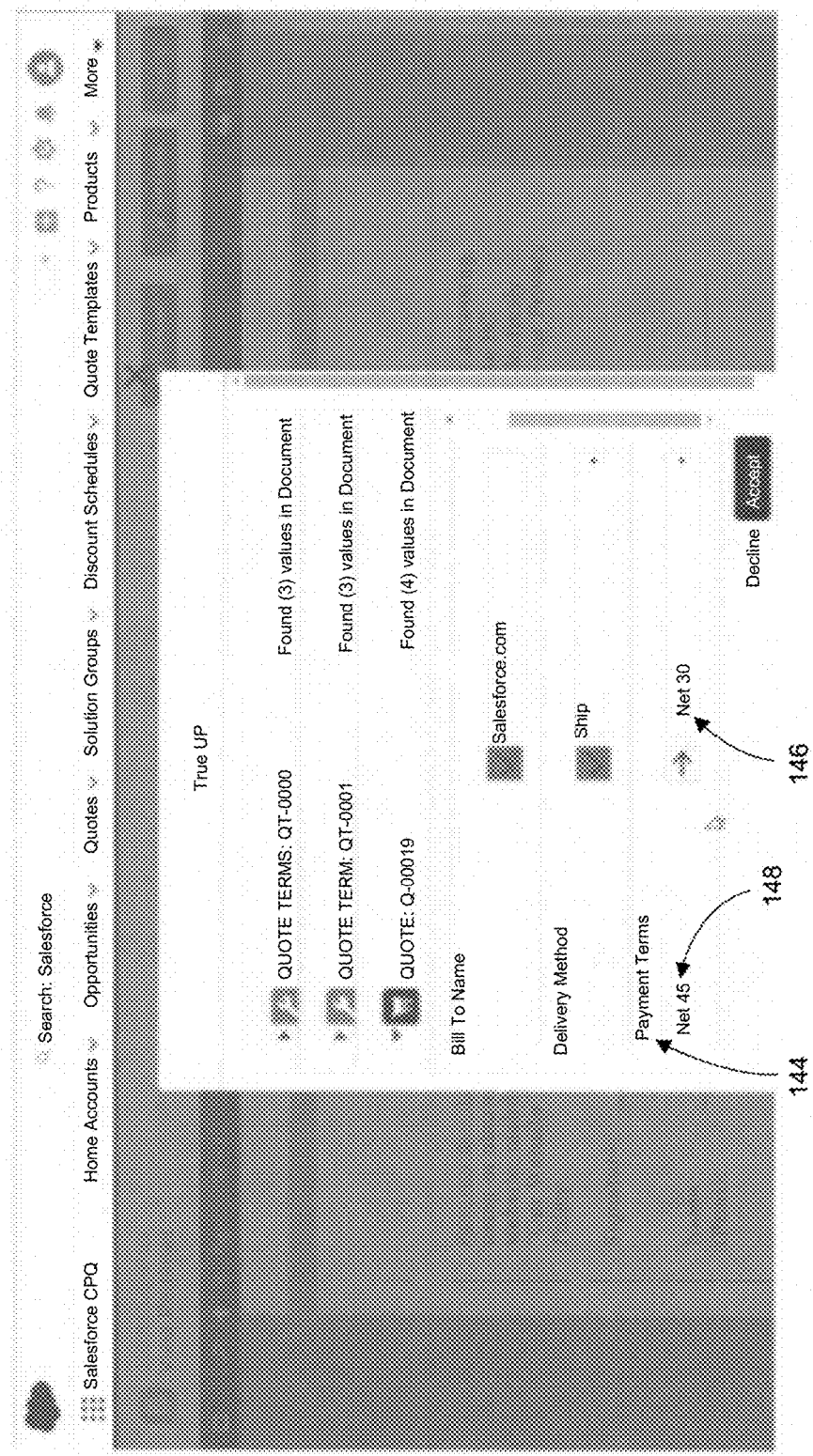
FIG. 10 depicts another reconciliation module display in accordance with embodiments of the present disclosure.
Figure 11:
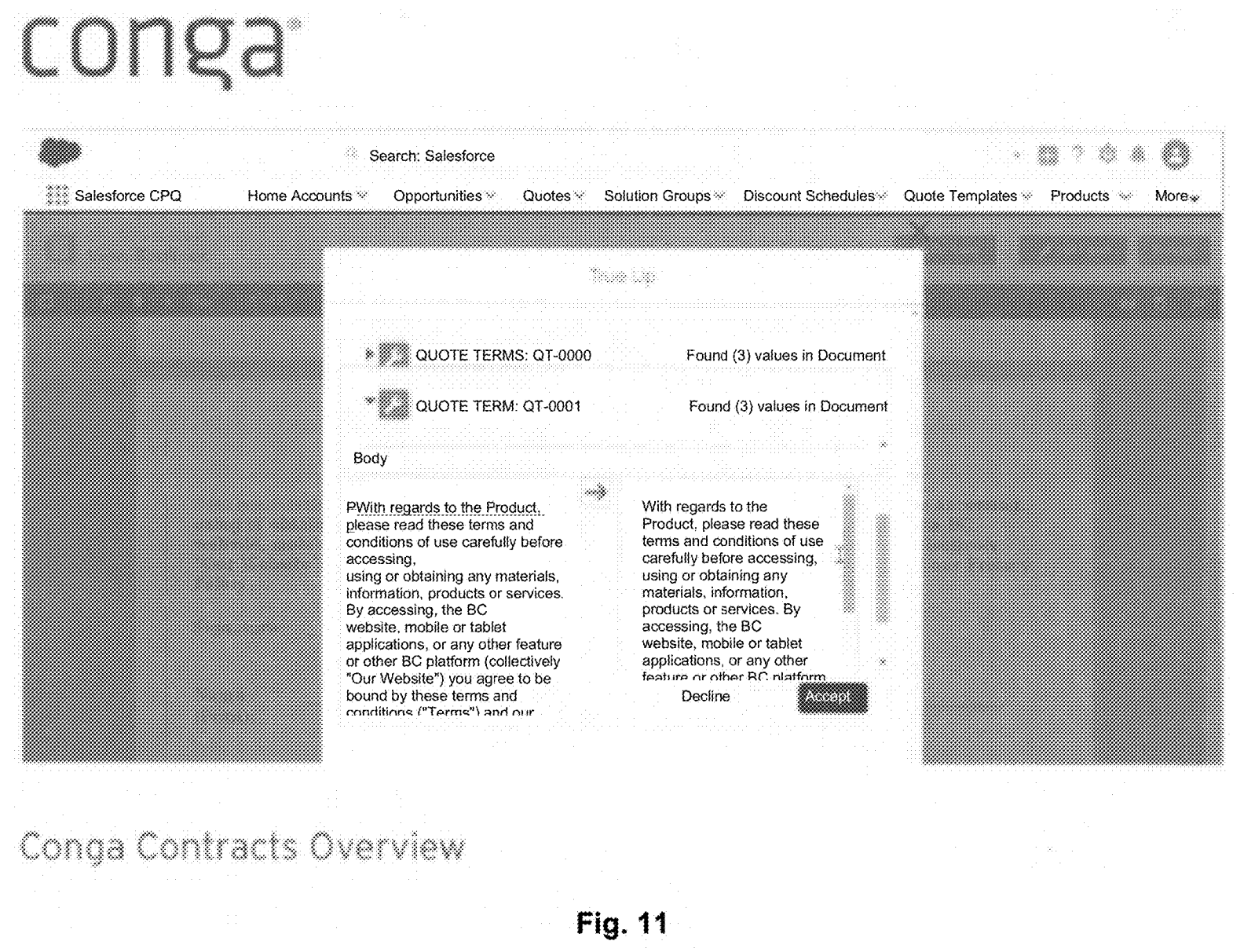

Referring now to FIGS. 9-11, another aspect of the system and method of the present disclosure is illustrated. After potentially numerous iterations to the document, a final negotiated document may be created through the system and methods described above. However, the document may still contain modifications, comments, annotations, etc. from several users, which require reconciliation before a true final document can be circulated.

In embodiments, reconciliation may occur by providing the user with the ability to compare and automatically identify or call out certain differences to be reconciled, including between different versions of a document, differences between the language or terms in a document and one or more data sources, or between documents of a related or similar nature. To illustrate, a particular term may have been modified by a user during a portion of the negotiation, but in other parts of the document that same term is not modified. The system therefore allows a user to compare changes made between any versions of the document, while being alerted to discrepancies that have emerged during the modification process. Thus, the reconciliation process is a critical process for generating a final, clean document.

In one embodiment, this reconciliation process is provided by a module known as True-up, and is shown in relation to FIGS. 9-11. In this embodiment, the reconciliation module recognizes the presence of tags (hidden or otherwise) that have been applied to certain data in the document, and flags each for reconciliation by the user. The module may also make updates to source data from which the tagged text has been extracted. In embodiments, the module may search for and identify potential issues for further reconciliation by the user. In other embodiment, the module may automatically reconcile issues created during the merging of modifications in a document, including modifications involving adding new content to a document. In one embodiment, the module is configured to identify and store new content added to a document. In embodiments, the new content may be stored in the CRM or equivalent repository.

A combination of automatic and user driven reconciliation if also contemplated in the present disclosure. By way of example, if the module recognizes that data merged from Salesforce has been modified, and those modifications accepted in the final document, the module has the ability to compare those modified data sets with the source data in Salesforce, and automatically update the source data with the modified values or text. Variations and combinations of the foregoing are contemplated.

Referring now in detail to FIG. 9, a user may access the True-up reconciliation module while utilizing the redlining features described above simply by selecting that module from a task bar, pick list, menu list or equivalent. By way of example, a user may initiate the True-up module for a particular document and, as reflected in FIGS. 9-11, step through each term or clause in the document that requires some degree of reconciliation. To further illustrate this principle, and referring specifically to FIG. 10, if a particular Payment Term 144 has been modified from Net 30 146 to Net 45 148, and the associated source data in Salesforce (or an equivalent CRM) still reflects Net 30, the True-up module will prompt the user to reconcile that term with the source data (in Salesforce or otherwise). This reconciliation module provides an important service to the user, once the negotiation is completed, such that a document owner, or in some instances a Salesforce contract administrator, may reconcile modified data and ensure the data in the document matches the data in Salesforce or other repository system.

In a preferred embodiment, the data to be reconciled consists of the data that was merged into the document when it was created, such as by Conga Composer, and appropriately tagged. In other embodiments, additional data may be tagged and tracked for future reconciliation, either by the original user or a subsequent user of the system.

Accordingly, the present disclosure provides a system and method for associating source data information (by way of example but not limitation, object identifiers, field names and the like) with information included in one or more legal or business-related documents. In this embodiment, a user may extract data from a document(s), including during and after modification of the document(s), where modifications have been made to fields that were merged in and otherwise contain source data information.

According to one embodiment, the present disclosure comprises a system of "bookmarks" or equivalent tags associated with the merged data to track the source of the data that was merged. In another embodiment, the system employs document variables to track the source of the data that was merged. As the information associated with the source data is modified, the corresponding source data may be updated automatically and seamlessly.

In one embodiment, each field that is merged into a document may be "bookmarked" by one or more invisible (or alternatively, visible) fields that contain pertinent source information needed to return updated data to the original source files. Whenever data is merged into a document, that data may be surrounded by the bookmarks in order for subsequent revisions to be interrogated for changes.

The field type for the word field may be ADDIN, and is preferably not displayed to the user. The format of the fields will start with the following character sequence:
CCFIELD VERSION:

The initial layout for the field bookmarks will take the form of:
CCFIELD:VERSION:[START|END]:OBJECTID: FIELDNAME:CHECKSUM In one embodiment, the module parses the document for tags. Each set of tags encompasses a body of text. For each tag discovered the module will parse the tag to determine the repository field related to the text. In the case of bookmark tags, this would be determined by the OBJECTID and FIELDNAME in the tag. The OBJECTID and FIELDNAME are utilized to retrieve the source data from the repository for comparison.

According to this embodiment, CCFIELD comprises a string used to identify the ADDIN field as one to be parsed, and also indicates that other values should be ignored. VERSION represents the current version of the field specification, and in a preferred embodiment is set to 1. START|END comprise the two fields associated with the beginning and ending of each discrete merged piece of data, the beginning marked with a START and the ending marked with an END. OBJECTID represents the unique identifier of the object in the system the source data originated from. FIELDNAME represents the name associated with the given object that the data originated from. CHECKSUM represents a checksum operation of the following fields, preferably concatenated together: CongaSystemIdentifier+CongaObjectIdentifier+OBJECTID+FIELDNAME. In a preferred embodiment, CHECKSUM is CRC32 encoded.

In one embodiment, document variables are used in lieu of bookmarking to store origination data to validate returning data. These variables will include: A system identifier that uniquely identifies the system that generated the data. For example, in the example of a Salesforce application, this identifier may be set to the Organization ID, and may be used to validate data coming back in was created by the system in question. Variable may also include an object identifier, or unique ID of the object that generated the particular document. In the example of the Salesforce application, if a user generated a document off of a quote it would contain the ID of the Quote object that it was created from. In another embodiment, both bookmarking and document variables are employed with a document.

In other embodiments, the systems and methods described herein comprise the ability to associate metadata with a word, term or clause in a particular document. According to this embodiment, the system permits a user to take advantage of the features and functionality described elsewhere in this disclosure, regardless of whether the document was created using the tools and applications described above.

In a preferred embodiment, a user may upload a document to the system, which may be presented to the user via the application user interface according to any of the embodiments described herein. The user may then select text, clause or other information contained in the document by highlighting the desired content. Once the text string or other information has been highlighted, a pop-over user interface (for example, as shown in FIG. 1) appears for making selections to associate the text string with source data, such as Salesforce objects and/or fields. The source object can be determined by analyzing the Organization ID and Object ID document variables. Other identifying variables can be utilized in different implementations. If the source cannot be determined, other methods can be utilized to determine the source including user selection or a machine learning engine. If the pop-over user interface recognizes a part of the text string, the system may provide suggestions of objects and/or fields to associate with the highlighted text. If no suggestion is made, the user may select from a listing of data source types contained within the pop-over user interface, or may conduct a search for the appropriate data source to associate with the text string. After the user selection is made, the pop-over user interface allows the user to save the selection(s), and then the user repeats these steps for all remaining text strings and clauses that the user desires to associate with source data.

After completing the steps in the preceding paragraph, the user then saves the document with associated source data as a document type template, which now contains all of the user selected mappings to underlying data sources and is ready for review, negotiation and modification according to the other embodiments described herein. After a particular template has been created, every time the user imports another document of the same type, the system is configured to recognize the similarities and inject the metadata associated with the template into the new document. Alternatively, the user may select a template from a list of templates for injecting the same metadata into a newly imported document. In this manner, a user can quickly and easily create and save data mappings for various document types, regardless of whether those documents were initially created using the system and methods described above.

According to another embodiment, the system permits a user to inject text or other information contained within a dynamically created document with metadata. For instance, if a document was created and later undergoes revision that includes additional clause language in the document, a user may select to inject metadata corresponding to the newly added content and save time and/or resources otherwise required to individually select and map out data sources for text strings located within the additional clauses. Thus, injecting metadata may be accomplished to only a portion of a document, according to the user's preference.

In one aspect of the present disclosure, a system for identifying and classifying text contained within a document is described. According to this embodiment, terms, clauses or other information contained in the document may be parsed directly within the document, or alternatively converted by performing optical character recognition (OCR) on the document. Next, the document is analyzed to identify different portions or sections of the document. Next, the different parts of the document are extracted and classified based on matching or pattern recognition performed on each part. Whether the part is correctly classified by the system or not, the next step is to compare each part with templates stored in the system (i.e., the library described in further detail below) to identify any logical matches based on the content associated with each part. Any identified and matched parts of the document are then returned to the user for processing and mapping to any desired data sources, including by way of metadata injection described above. Specific user interfaces depicting the steps of identification and classification are appended hereto as FIGS. 12-13.

In another embodiment, the identifying and categorizing steps may involve a natural language module. The natural language module may be configured to recognize natural language appearing in a clause or section of a document. The natural language module may also be configured to determine a template correlating to the recognized language and either call up the template or provide the user with a selection of the closest matching templates. If the natural language engine determines that the recognized clause or section is not associated with a current template, the user may be provided with the option to create and name a new template. According to this embodiment, the system and method may comprise a deep neural net learning engine or equivalent computer machine learning engine, configured to model high-level abstractions in data appearing in a document. The system and method may further employ artificial neural networks comprising learned representations of data, and may further employ features such as automatic speech recognition, foreign language processing, and adaptive learning. The system may therefore comprise separate modules for employing each of the foregoing.

In certain embodiments, the system and method also comprises the step of converting the document to a recognizable format, such that the document may be parsed and categorized according to the system and method described above. In another embodiment, the user is provided with one or more interfaces for establishing new categories or criteria for a template or class of templates, based in part on the newly identified term, clause, section, etc.

According to one embodiment, a system and method for managing terms and clauses used in legal, commercial and business-related documents is disclosed. This system and method permits a user to search, identify, select and efficiently merge such terms and clauses into a document, and then manage the work product (i.e., the subsequent versions of the term or clause) in future document creation and/or negotiation. In one embodiment, the system automatically creates a repository for storing versions of a document, clause or term with saved versions reflecting modifications from an original. In use, a user may tag, name or otherwise label and/or categorize subsequent modifications to a document, clause or term, which may be viewed by other users during the negotiation and finalization of the document. In one embodiment, these labels and categorizations may be used either by a subsequent user or the adaptive learning module described above. User interfaces provided by the system allow a user to quickly and efficiently identify, categorize and store commonly used terms and clauses for future searching and selection by the user or another user of the system.

In one embodiment, the system further comprises a resource library or repository, where previously created or modified terms, clauses or complete documents, which may be configured for a specific user or user organization, have been automatically or manually categorized and managed. This library may be further subdivided to contain finally negotiated documents for managing by the user, or templates to be used in future document negotiation.

Figure 12:
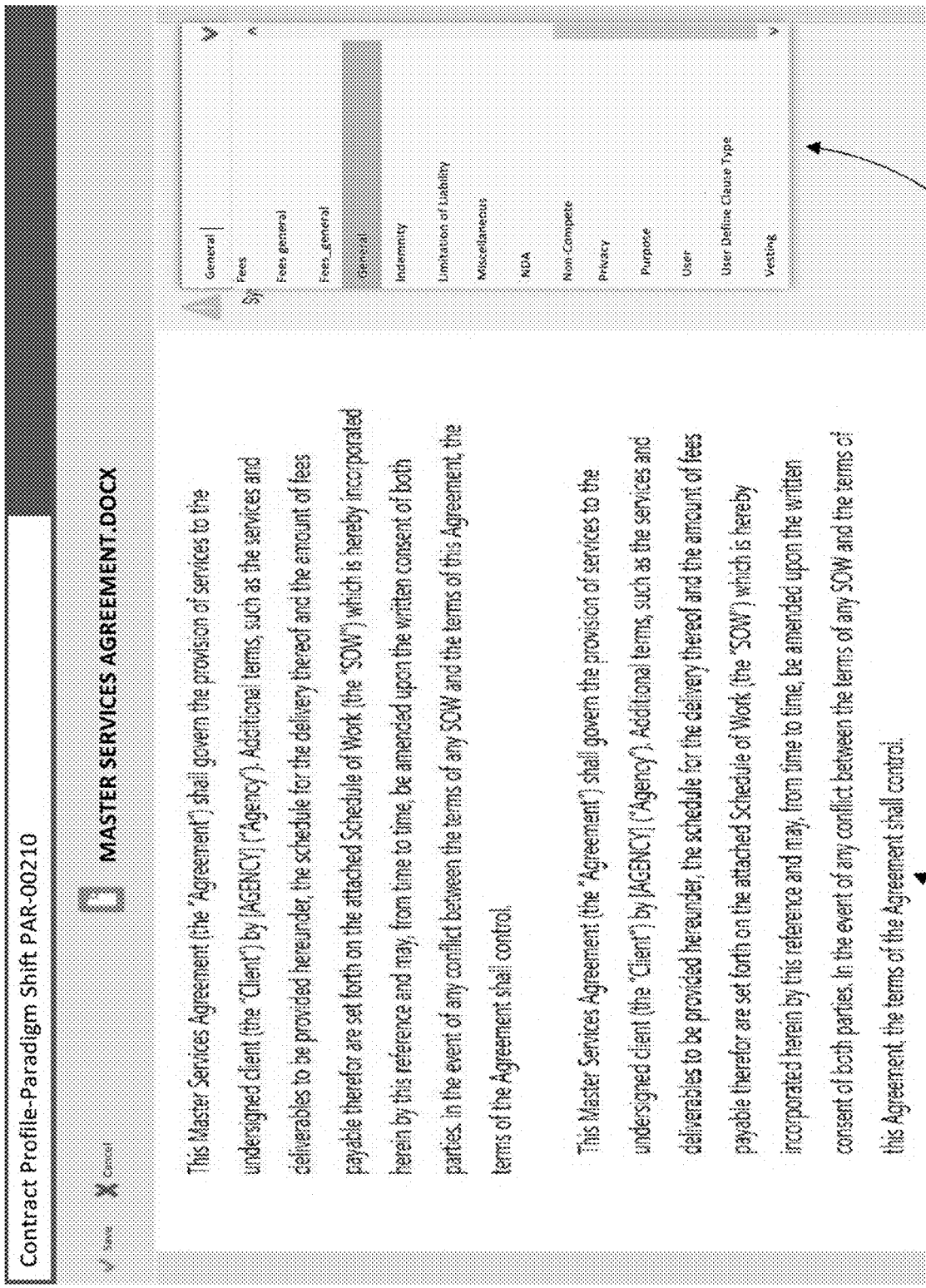
FIG. 12 depicts a clause identification module display in accordance with embodiments of the present disclosure.

Referring now to FIG. 12, a user interface 150 according to one embodiment is shown. The interface 150 preferably includes a portion 152 for displaying or previewing the document. The interface 150 may further comprise a list 154 to select a document type or category, and in certain embodiments may include the titles or names associated with the particular documents. In yet other embodiments, the interface includes an option for the user to input and search for key words associated with the desired document. In embodiments, the user interface also provides the user with the ability to modify and store new versions of documents in the library, with the ability to categorize and name custom made documents for future ease in locating.

In another embodiment, a library or equivalent repository may be provided to a large population of users to retrieve clauses or other content for a particular document type. Referring now to FIG. 13, a user interface 156 may be included with the system for allowing a user to scan various clauses and/or sort clauses based on a number of different criteria including, by way of example but not limitation, the clause name 158, clause revision 160, clause type 162, document name 164, document type 166, document revision 168, creation date 170, last updated date 172, last updated by 174, and created by, which may be listed in the interface for ease of review. Variations on the search and sort capabilities of the user interface shown in FIG. 13 are contemplated and considered within the scope of the present disclosure.

In other embodiments, the system may be configured to automatically query, retrieve and incorporate content contained in the library, based on (1) the document type, (2) objects/fields identified within the document, or (3) user preferences. User preferences may be preselected and configured by a user within the system or may be preferences made while accessing the library or repository.

In one embodiment, the system and method comprises at least one module for automatically providing the user with suggestions or recommendations. Accordingly, the system may be configured for automatically receiving suggestions or recommendations while engaged in any of the foregoing activities, for example suggesting a certain term based on either a particular clause incorporated by the user, or the appearance of a data source merged into a document accessible by the system.

Figure 14:
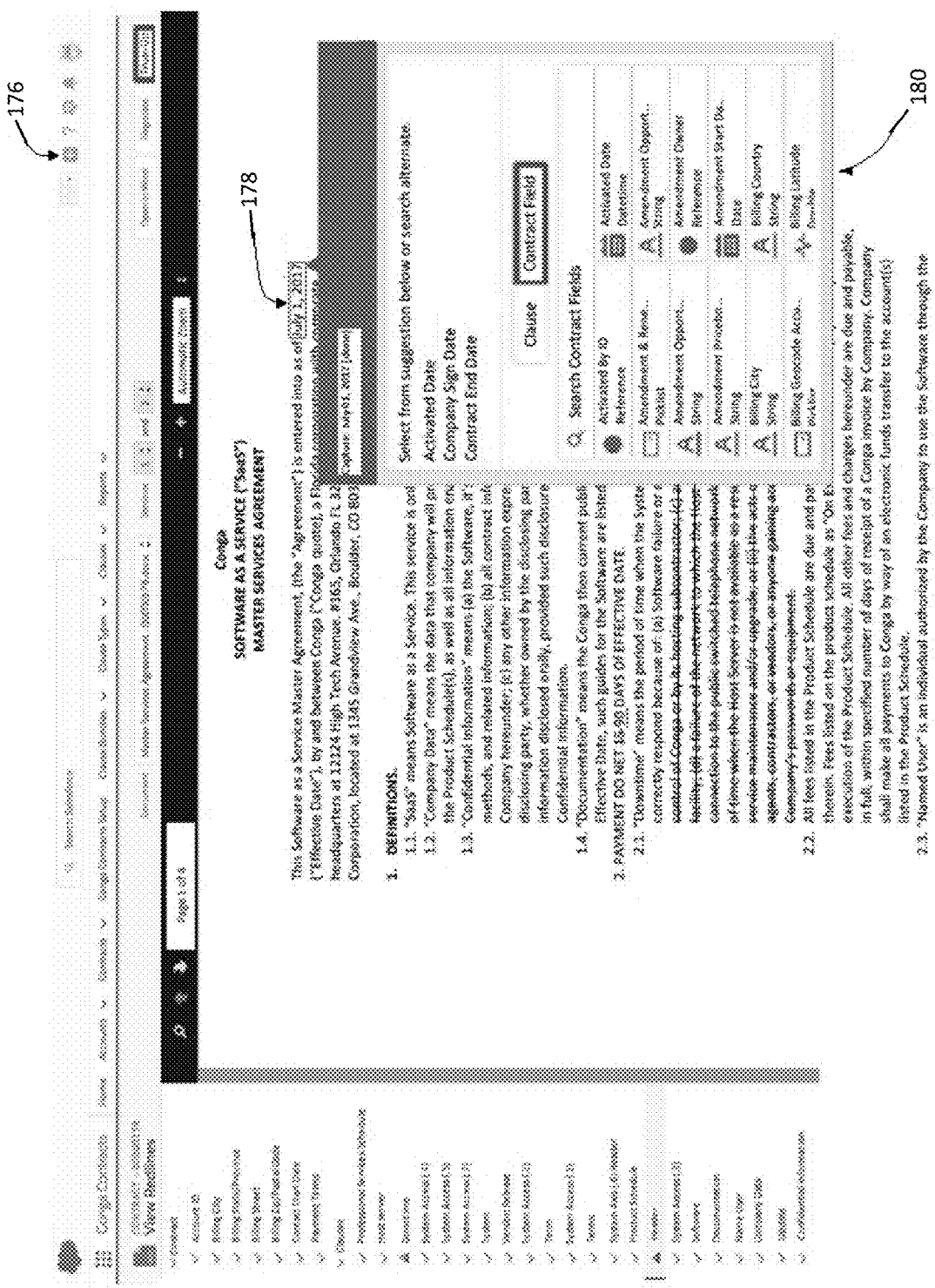
FIG. 14 depicts a suggestion service module display in accordance with embodiments of the present disclosure.

Referring now to FIGS. 14-15, the system may comprise a suggestion service module configured to analyze the content of a particular document under consideration and, based on either user-supplied criteria or a machine learning engine, identify potential relationships between the content in the document and one or more objects or fields from the source data. To illustrate, in one embodiment the system and method begins by calling up a document within the system. Next, the system consumes text strings from the document. Alternatively, a user may select certain text or clauses within a document before proceeding to the next step. After the text strings are identified or consumed by the system, each text string is analyzed and the system identifies and selects discrete entities within the text strings. Next, the system consumes objects and fields within the source data and creates a schema of the source data, along with associated metadata. Next, the system compares the discrete entities extracted from the text strings to the metadata and identifies potential relationships between the same (and presents the user with a suggestion).

The system may optionally present the user with an interface 176 to further investigate each suggestion, as shown in FIGS. 14-15, by highlighting 178 or otherwise calling out the entities with which the system has at least one suggestion. As the user scrolls through each highlighted entity, a pop-over display 180 preferably appears with the option of either selecting the suggestions identified by the system or, if preferred, searching all source data tags for making a new association between the particular entity and an object and/or field. Once selection is made, using either approach outlined above, the user is presented with the ability to save the entity values selected for the particular document. This functionality allows the user to save significant time, particularly with large and/or complex document types, by parsing a document and automatically identifying discrete entities within the document and suggestions of source data to associate with each of the discrete entities.

The system and method according to this embodiment may comprise a recommendation module. This module may be activated by the user, or alternatively running in the background while the user is engaged in any of the foregoing activities. By way of example, this recommendation engine may comprise a search of a particular document, identifying the type of document (or a clause within the document) and suggest further action by the user. For instance, the suggestion may contain a certain term based on either a particular clause incorporated by the user or, for example, the appearance of a data source merged into the negotiated document. In other instances, the recommendation engine searches the library or other repository for similar documents, and then identifies particular clauses or terms that are contained within those similar documents but are not incorporated into the working document. In another embodiment, the recommendation engine may suggest alternative clauses or terms from those contained in the working document.

In one embodiment, the recommendation engine may serve as a launching point for a user interested in creating a particular type of document. In this embodiment, the module may further comprise a rules engine, wherein the module queries the user according to the configuration of the rues engine, and then searches the repository for templates that most closely match the type of document desired by the user.

In yet another embodiment, the system and method provides analysis of the content of a document, identifies relationship(s) between discrete content in the document and realized (both potential and actual) objects/fields that may be associated with the document, and may provide suggestions or recommendations as to one or more Salesforce fields that text within the document may be associated with.

Figure 16:
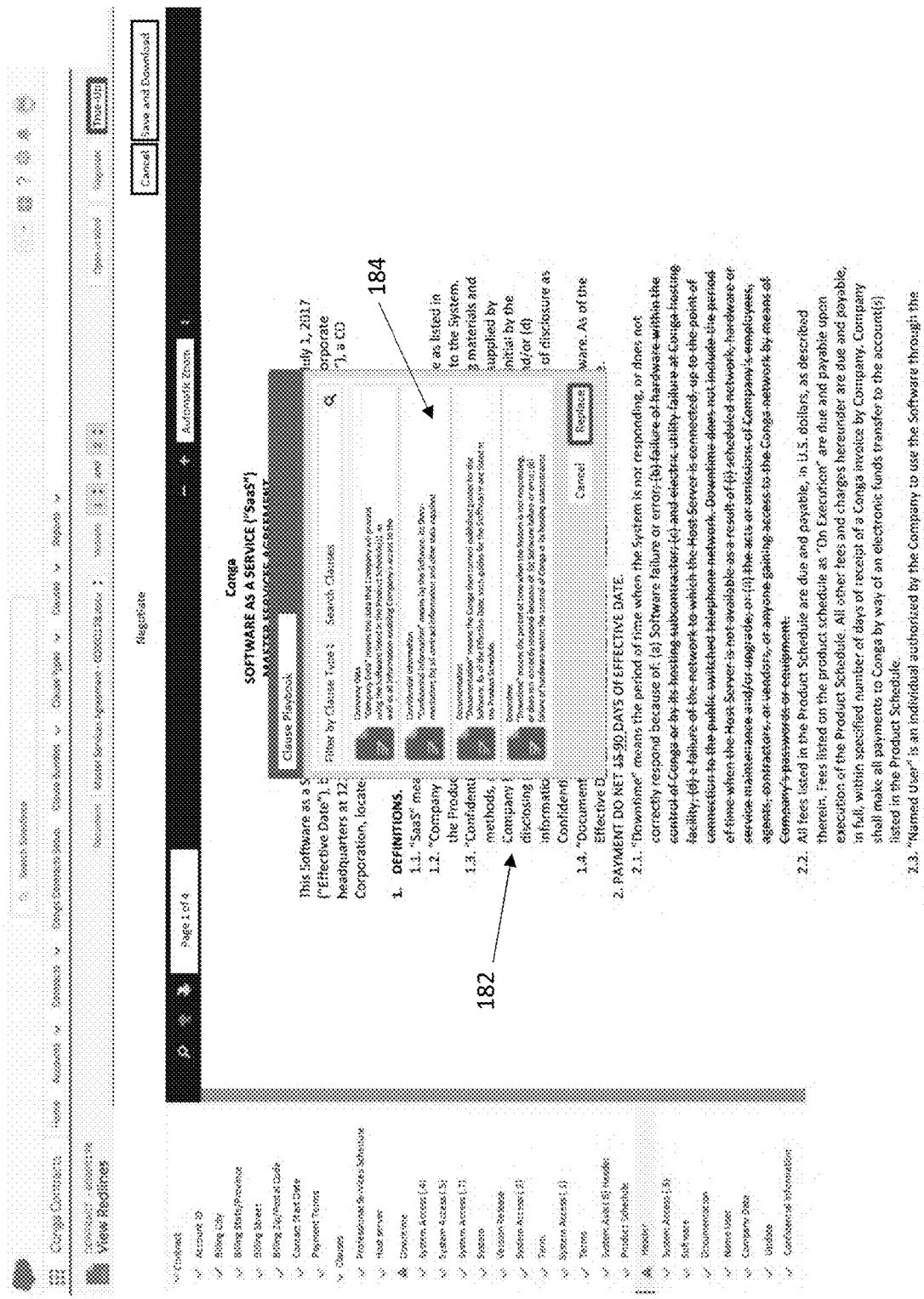
FIG. 16 depicts a merge module display in accordance with embodiments of the present disclosure.

Referring now to FIG. 16, the system described herein may further comprise a module for merging a particular clause, term or condition in a document without causing any formatting or other problems with the document. In this embodiment, a user may select a clause 182, for example, and access other clauses stored in the system. In one embodiment, the clauses may be recalled from the library or repository described above. Once the user identifies the preferred clause 184 to include in the document, the user selects that clause and merges it into the document, effectively replacing the original clause 182 in the document. The merge tool may comprise the ability to filter clauses by type or name, or in certain embodiments search for a particular clause using natural language search algorithms or their equivalent. The step of merging stored clauses into a document may be repeated as many times as necessary until the document has the content the user prefers, and is ready for sharing with other users. Alternately, the user may identify a clause that is more preferred than one in the library and decide to save that clause to the library. The system provides the user with this capability, thereby allowing the user to select the saved clause in future documents using the merge feature.

According to embodiments, the system may further provide the user with a visual representation of the document throughout the negotiation process, or otherwise presents the user with a graphical representation of the status of the document to better monitor various manipulations occurring over the course of the document lifecycle.

Figure 17:
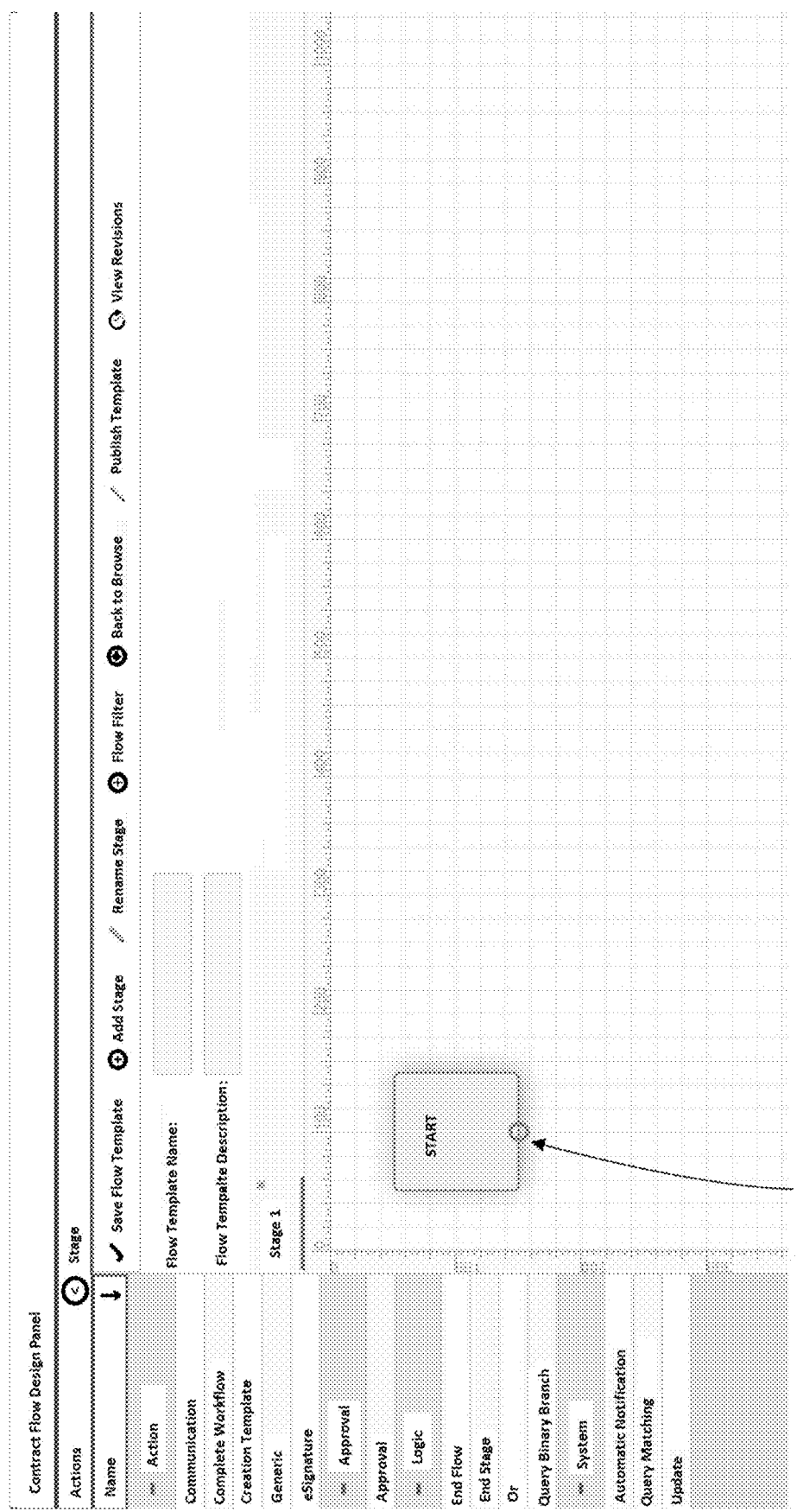
FIG. 17 depicts a visualization display in accordance with embodiments of the present disclosure.
Figure 18:
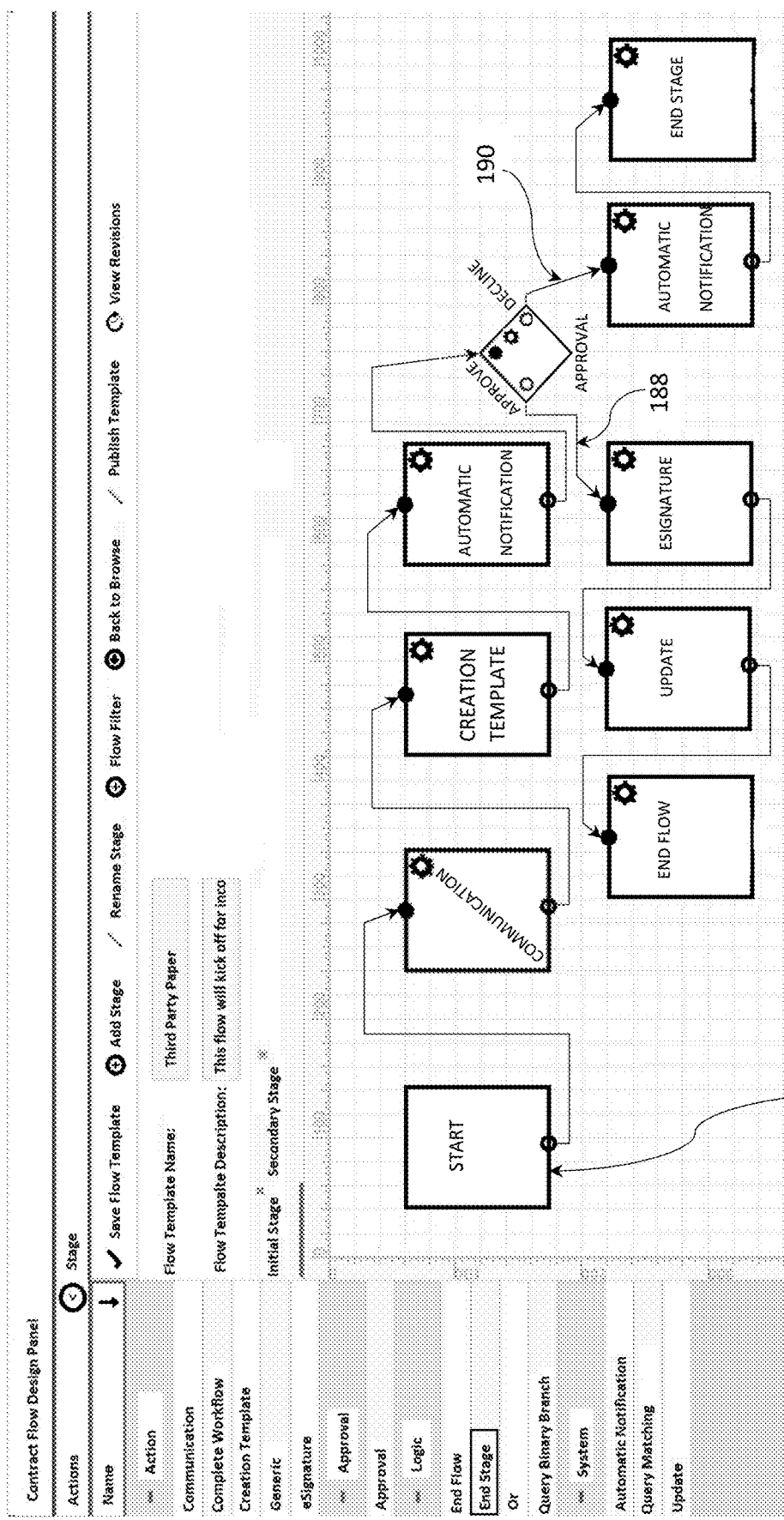
FIG. 18 depicts yet another visualization display in accordance with embodiments of the present disclosure.
Figure 19:
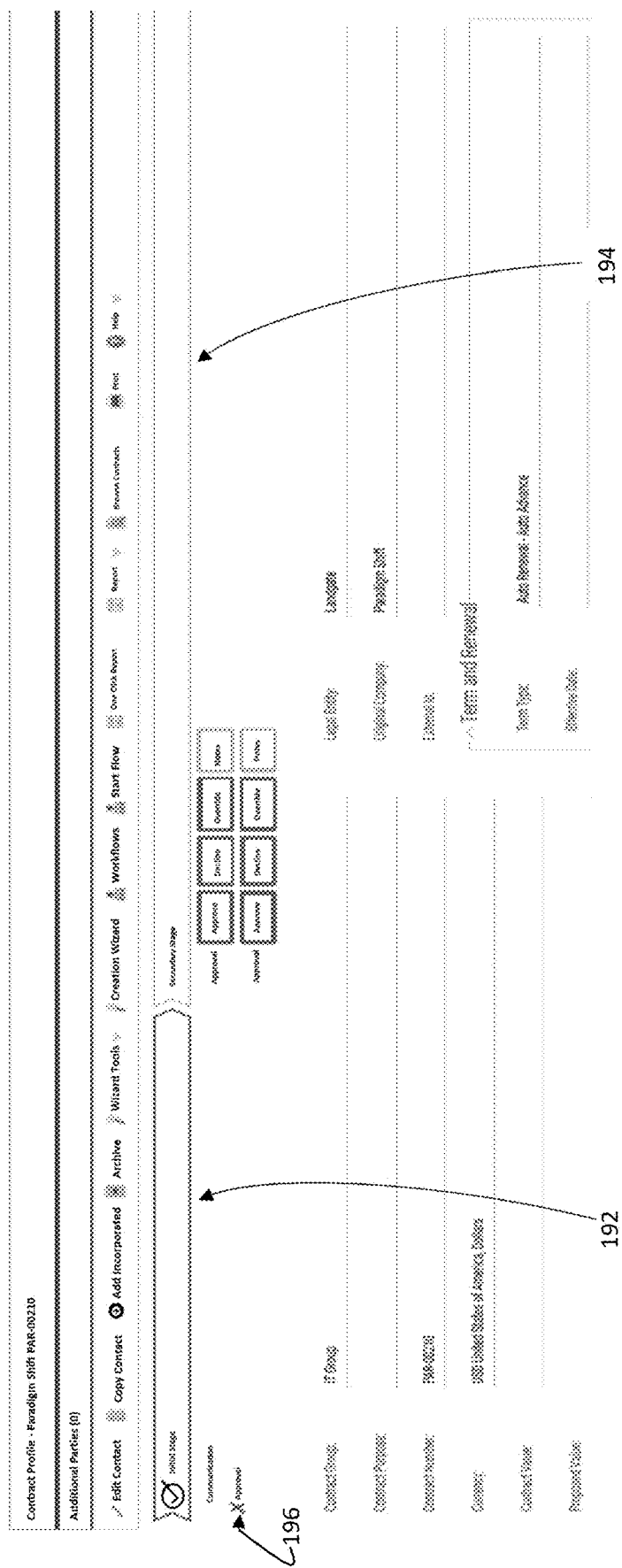
FIG. 19 depicts yet another visualization display in accordance with embodiments of the present disclosure.

Referring now to FIGS. 17-19, the system preferably includes a tool for visualizing the process of negotiation that occurs from inception until document completion. In one embodiment, this allow a user to create a visual representation of the document lifecycle, implement rules at different points in that lifecycle, and apply restrictions as necessary for different stages of the document negotiation. Referring first to FIG. 17, a certain task or activity or event may be represented in the system by a block 186, bubble or other icon. Additional tasks, activities and events may be subsequently built, with relationship interrelating the different icons. For example, and with reference to FIG. 18, the visual representation may comprise multiple paths 188, 190, depending on a certain event occurring (or not occurring) or a different event occurring (or not occurring). Depending on the outcome, the visual representation may include a different path and set of tasks, activities or events.

Referring now to FIG. 19, a different user interface may be provided to some or all users after the diagrams shown in FIGS. 17-18 have been configured. In this interface, the user is presented only with the tasks, activities or events that are current or immediate, and guides the user from one task, activity or event to the next. This interface may include task bars 192, 194, as shown in FIG. 19, and include different colors or other indicia to indicate to the user the status of those tasks. The interface may also provide a user with a quick visualization 196 of the document negotiation process, immediately alerting the user of tasks, activities or events that have yet to occur and the user(s) responsible for those remaining steps. In certain embodiments, a user may be alerted once the process flow advances to a task, activity or event that user is responsible for. Variations on the interfaces described in this section are contemplated.

A method of identifying and extracting data according to one embodiment will now be described. In one aspect of the disclosure, the user is provided with a system for identifying and extracting text from a native document. The system may include one or more processors, memory, an identifier module and an extractor module, which receives the document, identifies text and other fields in the document, recognizes data to be associated within the document and marks that data. The method of using the system in this manner comprises several steps, described below, which permit the user to make and review modifications to a native document and then reconcile the document, as described above. In this manner, any document type may employ the systems and methods described herein.

In one embodiment, a method is provided whereby data is automatically identified and retrieved from a document. Text from most electronically kept documents can be identified and categorized, regardless of the type of document. In one embodiment, an OCR process may be applied to a document to first identify, and later mark, text representing data to be merged during the course of negotiating the document. A search algorithm may be employed to assist with identifying and locating all text to be tagged.

In embodiments, the system and method comprises a text identifier and extractor module. More specifically, one or more hardware and software components may be involved, including one or more of the previously described hardware components, to perform one or more of the steps of this method. The method may be executed as a set of computer-executable instructions executed by a computer system and encoded or stored on a computer-readable medium.

The method of identifying and extracting data may continuously flow in a loop, flow according to a timed event, or flow according to a change in an operating or status parameter. The method may be initiated when a document is received at the text identifier and extractor module. Upon receiving the document, the text identifier and extractor module may perform an OCR or equivalent native langue search process on the document to retrieve one or more text tokens. Next, the text identifier and extractor module may apply one or more rules to the sequences of text tokens received from the OCR process, using an existing or new rules set. For example, knowledge of a particular document type may determine or influence one or more rules that are applied and thereby tags that are assigned to data identified in the document. The application of the rules continues in this step until it is determined if there are no further rules to apply to the document or the text tokens created during the preceding steps.

The method may then move to the next step, where it is determined whether there are additional pages in the document in which to search for additional text tokens. If there are more pages to be searched, the method retrieves the next page and continues with the extraction steps described above. Otherwise, the method proceeds to the next step, where it is determined if the retrieved text token(s) match recognized pattern elements. These pattern elements may be closely tied to rules described above, and further assist in the method of associating the natively captured text with the type of information to be tagged in the document. If a match is found, the method then proceeds to identify the text to be tagged respective to that matched pattern, and continues for each pattern recognized from the native document. This process is completed until there are no more patterns recognized and no more rules to apply.

Once the document has been searched, the pertinent text tagged, the method may then create an original source document for use by the various systems and methods described above. Processes described above with respect to modifying and reconciling modifications to the document may commence.

Referring again to the text identifier and extractor module, the OCR process referenced above may produce a sequence of text tokens, which represent lines of text on a page of the document. For example, for each line of text on a page, a separate token representing text desired for tagging may be generated. In some instances, multiple tokens may be generated for a single line of text in the document. In other instances, a single token may be generated for multiple lines of a document.

In one embodiment, a text verification module may be utilized. In this embodiment, the text tokens recovered by the OCR process may be compared to text characters in the native document or in a separate document of the same type, such as one of the documents located in the library or other repository described above. If any discrepancy between the tokens identified in the OCR process and the text are found, a separate discrepancy process may be initiated to resolve such a discrepancy.

Upon receiving the document that has been subjected to OCR, the text identifier and extractor module may utilize rules according to one or more document classifications. As one example, if the text identifier and extractor module is utilized to identify data from a business-related document, such as a warranty, the text identifier and extractor module may utilize rules previously established for warranty-related documents. The text identifier and extractor module may utilize a group or subgroup of rules applying to the document type, may utilize a group or subgroup of rules for a warranty with a specific vendor, or may utilize a group or subgroup of rules for a specific client.

As native documents are processed according to the systems and methods described above, those documents may be added to the library or other repository. The information may be sent to or otherwise associated with a user profile, such that a user associated with the user profile may access and/or send the document to another user or business entity.

In one embodiment, a method for suggesting certain associations between content in a document and one or more data sources is provided. According to this embodiment, the method comprises one or more of the following steps, regardless of sequence: calling up a document within the system; consuming text strings from the document; selecting text or clauses within a document; analyzing the text strings; selecting one or more discrete entities within the text strings; consuming objects and fields within a data source; creating a schema associated with the data source; gathering associated metadata; comparing the discrete entities to the metadata; identifying potential relationships; and, presenting the user with a suggestion.

In embodiments, the systems and methods described above may further comprise an application, or be provided via one or several modules. In one embodiment, the application/modules are designed to operate on a mobile device or mobile computer, and assist a user with managing organizational documents and associated data organization. In one embodiment, the application/modules may comprise one or more data sets, tables or databases, including one or more relational databases. In one embodiment, the application includes time and/or content-specific notifications. In embodiments, the application/modules further permit a user to sort, search and modify documents and manipulate data associated therewith, in many instances automatically.

According to this embodiment, the application preferably is configured to run on a computer server or similar computational machinery. The application is also preferable configured to provide alerts. Alerts may be provided via the application (e.g., notification upon login, push notification), email, messaging, or any other suitable method of communication to the user. Alerts may be defined for certain conditions, for example, modification occurring to one or more clauses or data types in a document. Alternately, alerts may be provided for continued modification or approval of a modified document. For example, alerts may be provided based on all users completing the modification of a document. In certain embodiments, an alert may indicate a recommended course of action. For example, the alert may recommend that content not already contained within a document be incorporated, or that specific data be modified to comply with predetermined rules established by one or more users.

In this embodiment, the application is advantageously configured to receive and send information by, for example, a user's mobile device. The application is also preferably configured to generate a plurality of reports. Such reports may be used by the user to improve strategy and decision-making, to locate a template or sample clause from the library, or to facilitate reconciliation of different versions of a document.

In one embodiment, the application comprises one or more user interfaces and displays, such as the displays depicted in the drawing Figures appended hereto. The application may be stored or operated on a computing environment, wherein the systems, devices, servers, modules, etc. may execute.

In varying embodiments described herein, a pop-over interface is provided to allow a user to reconcile modifications made in a document, capture document content for association with one or more data sources, receive suggestions from the service and/or recommendation service modules, and access the document and clause library or other repository. In certain embodiments, the pop-over interface may be configured to appear automatically in one or more user interfaces, such that when a user performs a certain action or selects a certain tool, the pop-over interface locates the portion of the document where that action or tool is applicable and presents the information needed to complete the task selected by the user. The user may perform various different tasks using the pop-over interface, without the need to locate an item in one of several pick lists or drop-down menus.

The computing environment preferably includes one or more user computers. The computers may be general purpose personal computers (including, merely by way of example, personal computers, and/or laptop computers running various versions of Microsoft Corp.'s Windows☐ and/or Apple Corp.'s Macintosh☐ operating systems) and/or workstation computers running any of a variety of commercially-available UNIX☐ or UNIX-like operating systems. These user computers may also have any of a variety of applications, including for example, database client and/or server applications, and web browser applications. Alternatively, the user computers may be any other electronic device, such as a thin-client computer, Internet-enabled mobile telephone, and/or personal digital assistant, capable of communicating via a network and/or displaying and navigating web pages or other types of electronic documents. Any number of user computers may be supported.

The computing environment described according to this embodiment preferably includes at least one network. The network can be any type of network familiar to those skilled in the art that can support data communications using any of a variety of commercially-available protocols, including without limitation SIP, TCP/IP, SNA, IPX, AppleTalk, and the like. Merely by way of example, the network maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth☐ protocol known in the art, and/or any other wireless protocol); and/or any combination of these and/or other networks.

The system in varying embodiments may also include one or more server computers. One server may be a web server, which may be used to process requests for web pages or other electronic documents from user computers. The web server can be running an operating system including any of those discussed above, as well as any commercially-available server operating systems. The web server can also run a variety of server applications, including SIP servers, HTTP servers, FTP servers, CGI servers, database servers, Java servers, and the like. In some instances, the web server may publish operations available operations as one or more web services.

According to certain embodiments, the computing environment may also include one or more file and or/application servers, which can, in addition to an operating system, include one or more applications accessible by a client running on one or more of the user computers. The server(s) may be one or more general purpose computers capable of executing programs or scripts in response to the user computers. As one example, the server may execute one or more web applications. The web application may be implemented as one or more scripts or programs written in any programming language, such as Java™, C, C#□, or C++, and/or any scripting language, such as Perl, Python, or TCL, as well as combinations of any programming/scripting languages. The application server(s) may also include database servers, including without limitation those commercially available from Oracle, Microsoft, Sybase™, IBM™ and the like, which can process requests from database clients running on a user computer.

In embodiments, the web pages created by the application server may be forwarded to a user computer via a web server. Similarly, the web server may be able to receive web page requests, web services invocations, and/or input data from a user computer and can forward the web page requests and/or input data to the web application server. In further embodiments, the server may function as a file server. Although the foregoing generally describes a separate web server and file/application server, those skilled in the art will recognize that the functions described with respect to servers may be performed by a single server and/or a plurality of specialized servers, depending on implementation-specific needs and parameters. The computer systems, file server and/or application server may function as an active host and/or a standby host.

In embodiments, the computing environment may also include a database. The database may reside in a variety of locations. By way of example, database may reside on a storage medium local to (and/or resident in) one or more of the computers. Alternatively, it may be remote from any or all of the computers, and in communication (e.g., via the network) with one or more of these. In a particular embodiment, the database may reside in a storage-area network ("SAN") familiar to those skilled in the art. Similarly, any necessary files for performing the functions attributed to the computers may be stored locally on the respective computer and/or remotely, as appropriate. In one set of embodiments, the database may be a relational database, which is adapted to store, update, and retrieve data in response to SQL-formatted commands.

The computer system may also comprise software elements, including but not limited to application code, within a working memory, including an operating system and/or other code. It should be appreciated that alternate embodiments of a computer system may have numerous variations from that described above. For example, customized hardware might also be used and/or particular elements might be implemented in hardware, software (including portable software, such as applets), or both. Further, connection to other computing devices such as network input/output devices may be employed.

According to one embodiment, the server may include one or more components that may represent separate computer systems or electrical components or may software executed on a computer system. These components include a load balancer, one or more web servers, a database server, and/or a database. The load balancer is operable to receive a communication from the mobile device and can determine to which web server to send the communication. Thus, the load balancer can manage, based on the usage metrics of the web servers, which web server will receive incoming communications. Once a communication session is assigned to a web server, the load balancer may not receive further communications. However, the load balancer may be able to redistribute load amongst the web servers if one or more web servers become overloaded.

In embodiments, one or more web servers are operable to provide web services to the user devices. In embodiments, the web server receives data or requests for data and communicates with the database server to store or retrieve the data. As such, the web server functions as the intermediary to put the data in the database into a usable form for the user devices. There may be more or fewer web servers, as desired by the operator.

In this embodiment, a database server is any hardware and/or software operable to communicate with the database and to manage the data within the database. Database servers, for example, SQL server, are well known in the art and will not be explained further herein. The database can be any storage mechanism, whether hardware and/or software, for storing and retrieving data. The database can be as described further herein.

In embodiments, components of the web server can include hardware and/or software components. In embodiments, the web server includes a discovery web service. The discovery web service is operable to receive a first request from a user device. The first request is mapped to a predetermined web server. Thus, each mobile device is associated with a predetermined one or more web servers associated with the enterprise or organization of the user and/or user device.

According to one embodiment, a discovery web service extracts information from the request, e.g., the user's name, a user's mobile device identifier (e.g., a cell phone number, an Internet Protocol (IP) address, etc.), or some other identifying information. This information is compared to a stored table or other data to match the user device to an assigned web server. If the mobile device is assigned to the web server, the request is passed to the device interface. However, if the mobile device is mapped to another web server, the discovery web service can redirect the request and the mobile device by replying to the request with a redirect message that includes the uniform resource locator (URL) for the other web server. In this way, the system is expandable, as new web servers can be easily added as new enterprises use the system.

In varying embodiments described herein, reference has been made to Conga Composer. However, it should be understood that other documents, which have not been created using Conga Composer, may enjoy the benefits of the systems and methods described herein. For example, a document associated with the Salesforce CPQ application may be used with the foregoing systems and methods. In yet other embodiments, a completely native version of a document may be uploaded and used with the systems and methods described herein. In one embodiment, the native document may pass through an additional module or modules in order to associate data sources with text or other data contained in the native document, so as to enjoy the benefits of automatic tracking and management of modifications during the course of negotiation.

In the foregoing description, for the purposes of illustration, systems and methods were described in a particular order. It should be appreciated that in alternate embodiments, the methods may be performed in a different order than that described. It should also be appreciated that the methods described above may be performed by hardware components or may be embodied in sequences of executable instructions on machine-readable media, and which cause a machine, such as a general-purpose or special-purpose processor or logic circuits programmed with the instructions to perform the methods. These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

The invention claimed is:

1. A method for selecting and associating content in a document associated with a customer relationship management system and metadata from a data source contained with the customer relationship management system, comprising the steps of:
   presenting the document associated with the customer relationship management system to a user;
   selecting text within the document by the user;
   analyzing text strings of the selected text by a system;
   identifying and selecting, by the system, one or more discrete entities associated with the text strings of the selected text;
   consuming objects and fields, by the system, within the data source to associate the one or more discrete entities;
   gathering associated metadata from the consumed objects and fields by the system;
   comparing, by the system, the one or more discrete entities to the associated metadata;
   identifying relationships, by the system, between the one or more discrete entities and the objects and fields within the data source based on the comparing step;
   assigning relationships, by the system, between the one or more discrete entities and the objects and fields within the data source, wherein each of the one or more discrete entities having an assigned relationship with any one of the objects and fields further comprises:
   tagging each of the objects and fields;
   matching each of the objects and fields to the one more discrete entities; and
   linking each of the objects and fields with the assigned one or more discrete entities;
   wherein the tagging and linking applied to the objects and fields permit modifications to the selected text within the document to be autonomously updated in each of the respectively assigned objects and fields, including modifications made to the selected text in a different document;
   wherein the modifications to the objects and fields within the data source are autonomously reflected in the one or more discrete entities by the step of assigning relationships and tagging the objects and fields associated with each of the one or more discrete entities; and
   wherein each of the steps of presenting, analyzing, identifying and selecting, consuming, gathering, comparing, identifying relationships and assigning relationships are performed using a computational machine specifically configured to associate content in the document with the metadata from the data source.

2. The method of claim 1 wherein the data source is comprised of one or more databases associated with the customer relationship management system.

3. The method of claim 1 wherein the step of identifying and selecting further comprises receiving suggestions of the one or more discrete entities located within the text strings.

4. The method of claim 1 wherein the one or more discrete entities are comprised of clauses in the document.

5. The method of claim 1 wherein the steps of selecting text within the document and assigning relationships further comprise automatically identifying potential objects and fields to associate with or link to the selected text.

6. The method of claim 5 wherein the user is presented with a list of potential objects and fields to associate with or link to the selected text.

7. The method of claim 6 wherein the linked objects and fields are updated as changes are made to the associated selected text.

8. The method of claim 1 wherein the step of analyzing the text strings and selected text comprises recognizing at least a portion of one or more text strings and identifying potential objects and fields related to the at least a portion of the one or more text strings.

9. The method of claim 1 wherein the step of gathering associated metadata comprises identifying metadata relating to the text strings and selected text and injecting the metadata into one or more of the text strings.

10. The method of claim 1 wherein the steps of consuming text strings from the document, analyzing the text strings and selected text and consuming objects and fields within a data source are achieved autonomously.

11. The method of claim 1 further comprising a step of presenting the user with a suggestion, wherein the suggestion comprises certain terms, clauses or sections to include in the document.

12. The method of claim 11 wherein the suggestion comprises updating objects and fields consumed from the data source.

13. The method of claim 1 further comprising a step of performing reconciliation among the objects, fields or metadata associated with the document.

14. A method for associating content in a document associated with a customer relationship management system with data stored in a data source contained within the customer relationship management system comprising, the steps of:
presenting the document to a user;
selecting text within the document by the user;
analyzing one or more text strings within the selected text;
identifying and selecting one or more text strings within the selected text;
consuming objects and fields within the data source;
gathering data associated with the objects and fields;
comparing the selected one or more text strings to the gathered data;
establishing relationships between the one or more text strings and the objects and fields within the data source by a system using a specially configured processor to:
tag each of the objects and fields;
match each of the objects and fields to the one or more text strings; and
link each of the objects and fields with the matched one or more text strings, wherein the steps of tagging, matching and linking the one or more text strings with their associated objects and fields establishes relationships between the one or more text strings and the objects and fields within the data source;
wherein the tagging of the objects and fields permit modifications to the selected text within the document to be autonomously updated in each of the associated objects and fields, including modifications made to the selected text in a different document;
wherein the modifications to the objects and fields within the data source are autonomously reflected in the one or more text strings by the steps of establishing relationships and tagging the objects and fields; and
wherein the steps of presenting, analyzing, identifying and selecting, consuming, gathering, comparing, and establishing relationships are performed by the system using a computational machine specifically configured to associate content in the document with the data from the data source.

15. The method of claim 14, wherein the method further comprises the step of selecting one or more text strings that have tagged objects and fields, modifying the text of the selected one or more text strings, and automatically updating the associated objects and fields within the data source.

16. The method of claim 15, wherein the objects and fields tagged within the document are merged with the data source, such that the tagged objects and fields are automatically updated when the associated text strings are modified in the document.

17. The method of claim 16, wherein the objects and fields tagged within the document are updated within the data source when the same text strings in a different document are modified.

18. The method of claim 14, wherein the steps of selecting text within the document and establishing relationships further comprises automatically identifying potential objects and fields to tag and link to the one or more text strings associated with the selected text.

19. The method of claim 14 further comprising the step of performing autonomous reconciliation among the objects, fields or data associated with the one or more text strings contained in the document.

20. The method of claim 14, wherein the data source is comprised of one or more databases associated with the customer relationship management system.

* * * * *